US009208316B1

(12) United States Patent
Hill et al.

(10) Patent No.: US 9,208,316 B1
(45) Date of Patent: Dec. 8, 2015

(54) SELECTIVE DISABLING OF CONTENT PORTIONS

(75) Inventors: Peter F. Hill, Seattle, WA (US); Matthew L. Trahan, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 791 days.

(21) Appl. No.: 13/406,327

(22) Filed: Feb. 27, 2012

(51) Int. Cl.
*G06F 12/16* (2006.01)
*G06F 21/56* (2013.01)
*H04L 29/06* (2006.01)

(52) U.S. Cl.
CPC ............. *G06F 21/566* (2013.01); *H04L 63/145* (2013.01)

(58) Field of Classification Search
CPC ....... G06F 21/566; G06F 21/51; G06F 21/56; G06F 21/564; H04L 63/145
USPC ...................... 726/22–24; 709/245
See application file for complete search history.

(56) References Cited

U.S. PATENT DOCUMENTS

| 5,634,064 | A | 5/1997 | Warnock et al. |
|---|---|---|---|
| 5,872,850 | A | 2/1999 | Klein et al. |
| 5,961,593 | A | 10/1999 | Gabber et al. |
| 6,049,812 | A | 4/2000 | Bertram et al. |
| 6,108,637 | A | 8/2000 | Blumenau |
| 6,138,156 | A | 10/2000 | Fletcher et al. |
| 6,195,679 | B1 | 2/2001 | Bauersfeld et al. |
| 6,430,624 | B1 | 8/2002 | Jamtgaard et al. |
| 6,549,941 | B1 | 4/2003 | Jaquith et al. |
| 6,560,620 | B1 | 5/2003 | Ching |
| 6,625,624 | B1 | 9/2003 | Chen et al. |
| 6,704,024 | B2 | 3/2004 | Robotham et al. |
| 6,785,864 | B1 | 8/2004 | Te et al. |
| 6,871,236 | B2 | 3/2005 | Fishman et al. |
| 6,944,665 | B2 | 9/2005 | Brown et al. |
| 6,963,850 | B1 | 11/2005 | Bezos et al. |
| 7,003,442 | B1 | 2/2006 | Tsuda |
| 7,051,084 | B1 | 5/2006 | Hayton et al. |
| 7,054,952 | B1 | 5/2006 | Schwerdtfeger et al. |
| 7,085,736 | B2 | 8/2006 | Keezer et al. |

(Continued)

FOREIGN PATENT DOCUMENTS

WO WO 2013/003631 A2 1/2013

OTHER PUBLICATIONS

Bango, Rey "How JS & Ajax work in Opera Mini 4", Nov. 2, 2007, XP055050107, Retrieved from the Internet.

(Continued)

*Primary Examiner* — Thuong Nguyen
(74) *Attorney, Agent, or Firm* — Knobbe Martens Olson & Bear LLP

(57) ABSTRACT

Features are described for detecting and disabling potentially harmful items that are embedded within or referenced by network resources such as web pages. A network node, remote from a user's computing device, can compare content portions to a repository of content portions which are known to be harmful, or to a blacklist of resources which are known to be harmful. The network node can take preventative actions based on the nature of the threat and the nature of the resource. For example, the network node can modify or remove portions of source code, replace interactive content with static images, and/or disable objects. Other features include providing users with a mechanism to override the preventative measures and receive the original unprocessed content. The network node can monitor the user overrides and fine tune its detection of harmful content.

26 Claims, 18 Drawing Sheets

(56) References Cited

U.S. PATENT DOCUMENTS

| | | |
|---|---|---|
| 7,159,023 B2 | 1/2007 | Tufts |
| 7,171,478 B2 | 1/2007 | Lueckhoff et al. |
| 7,191,211 B2 | 3/2007 | Tuli |
| 7,353,252 B1 | 4/2008 | Yang et al. |
| 7,373,313 B1 | 5/2008 | Kahle et al. |
| 7,398,553 B1* | 7/2008 | Li ............................ 726/22 |
| 7,543,059 B2 | 6/2009 | Johnson et al. |
| 7,792,944 B2 | 9/2010 | DeSantis et al. |
| 7,831,582 B1 | 11/2010 | Scofield et al. |
| 7,865,957 B1* | 1/2011 | Gu et al. ..................... 726/24 |
| 7,975,000 B2 | 7/2011 | Dixon et al. |
| 7,996,912 B2 | 8/2011 | Spalink et al. |
| 8,010,545 B2 | 8/2011 | Stefik et al. |
| 8,015,496 B1 | 9/2011 | Rogers |
| 8,060,463 B1 | 11/2011 | Spiegel |
| 8,073,850 B1 | 12/2011 | Hubbard et al. |
| 8,103,742 B1 | 1/2012 | Green |
| 8,185,621 B2 | 5/2012 | Kasha |
| 8,249,904 B1 | 8/2012 | DeSantis et al. |
| 8,271,887 B2 | 9/2012 | Offer et al. |
| 8,316,124 B1 | 11/2012 | Baumback et al. |
| 8,336,049 B2 | 12/2012 | Medovich |
| 8,448,245 B2* | 5/2013 | Banerjee et al. .............. 726/22 |
| 8,621,621 B1* | 12/2013 | Burns et al. ................. 726/22 |
| 8,683,585 B1* | 3/2014 | Chen et al. .................. 726/22 |
| 2001/0039490 A1 | 11/2001 | Verbitsky et al. |
| 2002/0030703 A1 | 3/2002 | Robertson et al. |
| 2002/0194302 A1 | 12/2002 | Blumberg |
| 2003/0023712 A1 | 1/2003 | Zhao et al. |
| 2003/0041106 A1 | 2/2003 | Tuli |
| 2004/0083294 A1 | 4/2004 | Lewis |
| 2004/0083383 A1* | 4/2004 | Carmona .................... 713/200 |
| 2004/0139208 A1 | 7/2004 | Tuli |
| 2004/0181613 A1 | 9/2004 | Hashimoto et al. |
| 2004/0205448 A1 | 10/2004 | Grefenstette et al. |
| 2004/0220905 A1 | 11/2004 | Chen et al. |
| 2004/0243622 A1 | 12/2004 | Morisawa |
| 2005/0010863 A1 | 1/2005 | Zernik |
| 2005/0028002 A1* | 2/2005 | Christodorescu et al. .... 713/200 |
| 2005/0060643 A1 | 3/2005 | Glass et al. |
| 2005/0138382 A1 | 6/2005 | Hougaard et al. |
| 2005/0183039 A1 | 8/2005 | Revis |
| 2005/0246193 A1 | 11/2005 | Roever et al. |
| 2006/0085766 A1 | 4/2006 | Dominowska et al. |
| 2006/0095336 A1 | 5/2006 | Heckerman et al. |
| 2006/0122889 A1 | 6/2006 | Burdick et al. |
| 2006/0168510 A1 | 7/2006 | Bryar et al. |
| 2006/0184421 A1 | 8/2006 | Lipsky et al. |
| 2006/0248442 A1 | 11/2006 | Rosenstein et al. |
| 2006/0277167 A1 | 12/2006 | Gross et al. |
| 2006/0288418 A1* | 12/2006 | Yang et al. .................. 726/24 |
| 2006/0294461 A1 | 12/2006 | Nadamoto et al. |
| 2007/0022072 A1 | 1/2007 | Kao et al. |
| 2007/0027672 A1 | 2/2007 | Decary et al. |
| 2007/0094241 A1 | 4/2007 | Blackwell et al. |
| 2007/0124693 A1 | 5/2007 | Dominowska et al. |
| 2007/0139430 A1 | 6/2007 | Korn et al. |
| 2007/0226797 A1* | 9/2007 | Thompson et al. ............. 726/22 |
| 2007/0240160 A1 | 10/2007 | Paterson-Jones et al. |
| 2007/0288589 A1 | 12/2007 | Chen et al. |
| 2008/0028334 A1 | 1/2008 | De Mes |
| 2008/0104502 A1 | 5/2008 | Olston |
| 2008/0133540 A1* | 6/2008 | Hubbard et al. ............... 707/10 |
| 2008/0183672 A1 | 7/2008 | Canon et al. |
| 2008/0184128 A1 | 7/2008 | Swenson et al. |
| 2008/0320225 A1 | 12/2008 | Panzer et al. |
| 2009/0012969 A1 | 1/2009 | Rail et al. |
| 2009/0158432 A1* | 6/2009 | Zheng et al. .................. 726/24 |
| 2009/0164924 A1 | 6/2009 | Flake et al. |
| 2009/0204478 A1 | 8/2009 | Kaib et al. |
| 2009/0217199 A1 | 8/2009 | Hara et al. |
| 2009/0248680 A1 | 10/2009 | Kalavade |
| 2009/0254867 A1 | 10/2009 | Farouki et al. |
| 2009/0282021 A1 | 11/2009 | Bennett |
| 2009/0287698 A1 | 11/2009 | Marmaros et al. |
| 2009/0327914 A1 | 12/2009 | Adar et al. |
| 2010/0017880 A1* | 1/2010 | Masood ..................... 726/24 |
| 2010/0036740 A1 | 2/2010 | Barashi |
| 2010/0057639 A1 | 3/2010 | Schwarz et al. |
| 2010/0125507 A1 | 5/2010 | Tarantino, III et al. |
| 2010/0131594 A1 | 5/2010 | Kashimoto |
| 2010/0138293 A1 | 6/2010 | Ramer et al. |
| 2010/0218106 A1 | 8/2010 | Chen et al. |
| 2010/0293190 A1 | 11/2010 | Kaiser et al. |
| 2010/0312788 A1 | 12/2010 | Bailey |
| 2010/0318892 A1 | 12/2010 | Teevan et al. |
| 2010/0332513 A1 | 12/2010 | Azar et al. |
| 2011/0022957 A1 | 1/2011 | Lee |
| 2011/0029854 A1 | 2/2011 | Nashi et al. |
| 2011/0055203 A1 | 3/2011 | Gutt et al. |
| 2011/0078140 A1 | 3/2011 | Dube et al. |
| 2011/0078705 A1 | 3/2011 | Maclinovsky et al. |
| 2011/0119661 A1 | 5/2011 | Agrawal et al. |
| 2011/0161849 A1 | 6/2011 | Stallings et al. |
| 2011/0173177 A1 | 7/2011 | Junqueira et al. |
| 2011/0173637 A1 | 7/2011 | Brandwine et al. |
| 2011/0178868 A1 | 7/2011 | Garg et al. |
| 2011/0185025 A1 | 7/2011 | Cherukuri et al. |
| 2011/0191327 A1 | 8/2011 | Lee |
| 2011/0197121 A1 | 8/2011 | Kletter |
| 2011/0246873 A1 | 10/2011 | Tolle et al. |
| 2011/0289074 A1 | 11/2011 | Leban |
| 2011/0296341 A1 | 12/2011 | Koppert |
| 2011/0302510 A1 | 12/2011 | Harrison et al. |
| 2012/0002839 A1* | 1/2012 | Niemela et al. ............... 382/100 |
| 2012/0072821 A1 | 3/2012 | Bowling |
| 2012/0084644 A1 | 4/2012 | Robert et al. |
| 2012/0096365 A1 | 4/2012 | Wilkinson et al. |
| 2012/0110017 A1 | 5/2012 | Gu et al. |
| 2012/0137201 A1 | 5/2012 | White et al. |
| 2012/0143944 A1 | 6/2012 | Reeves et al. |
| 2012/0150844 A1 | 6/2012 | Lindahl et al. |
| 2012/0166922 A1 | 6/2012 | Rolles |
| 2012/0198516 A1 | 8/2012 | Lim |
| 2012/0215834 A1 | 8/2012 | Chen et al. |
| 2012/0215919 A1 | 8/2012 | Labat et al. |
| 2012/0284629 A1 | 11/2012 | Peters et al. |
| 2012/0317295 A1 | 12/2012 | Baird et al. |
| 2012/0331406 A1 | 12/2012 | Baird et al. |
| 2013/0007101 A1 | 1/2013 | Trahan et al. |
| 2013/0007102 A1 | 1/2013 | Trahan et al. |
| 2013/0031461 A1 | 1/2013 | Hou et al. |
| 2013/0080611 A1 | 3/2013 | Li et al. |

OTHER PUBLICATIONS

Brinkmann, M, "Record and Share your browser history with Hooeey," ghacks.net, Feb. 26, 2008, 6 pages, printed on Jan. 25, 2013.

Considine, A, "The Footprints of Web Feet," The New York Times, Mar. 4, 2011, 3 pages, printed on Jan. 25, 2013.

EyeBrowse: Record, Visualize and Share your Browser History, Information Aesthetics, Sep. 18, 2009, 2 pages, printed on Jan. 25, 2013.

Feuerstein, Adam, "Flyswat Takes Aim," San Francisco Business Times, printed from http://www.bizjournals.com/sanfrancisco/stories/1999/10/25/story2.html?t=printable, Oct. 22, 1999, 2 pages.

Gabber et al., "How to Make Personalized Web Browsing Simple, Secure, and Anonymous," Financial Cryptography, 16 pages (1997).

Gingerich, Jason, "Keycorp Making Site Into Portal," KRTBN Knight-Ridder Tribune Business News (South Bend Tribune, Indiana), Oct. 25, 1999, 2 pages.

Hopper, D. Ian, "Desktops Now Have Power to Comparison-Shop," Oct. 18, 1999, printed from http://www.cnn.com/TECH/computing/9910/18/r.u.sure/index.html, 3 pages.

Van Kleek, M, Introducing "Eyebrowse"—Track and share your web browsing in real time, Haystack Blog, Aug. 28, 2009, 3 pages, printed on Jan. 25, 2013.

Web page titled "RSS Ticker: Add-ons for Firefox," https://addons.mozilla.org/en-US/firefox/addon/rss-ticker/, 3 printed pages, printed on Feb. 7, 2013.

Web page titled "What Internet Users Do On A Typical Day, Trend Data (Adults), Pew Internet & American Life Project," printed from

(56) References Cited

OTHER PUBLICATIONS http://pewinternet.org/Static-Pages/Trend-Data-(Adults)/Online-Activities-Daily.aspx on Nov. 29, 2012, 4 pages.

Rao, H.C.-H., et al., "A Proxy-Based Personal Web Archiving Service," Operating Systems Review, 35(1):61-72, 2001.

Teevan, J., et al., "Changing How People View Changes on the Web," 2009, Proceedings of the 22$^{nd}$ Annual ACM Symposium on User Interface Software and Technology, New York, 2009, pp. 237-246.

Baumann, A., et al., Enhancing STEM Classes Using Weave: A Collaborative Web-Based Visualization Environment, Integrated Stem Education Conference, Apr. 2, 2011, Ewing, New Jersey, pp. 2A-1-2A-4.

De Carvalho, L.G., et al., Synchronizing Web Browsing Data With Browserver, Proceedings of the IEEE Symposium on Computers and Communications, Jun. 22-25, 2010, Riccione, Italy, pp. 738-743.

Chen, H., et al., "Bringing Order to the Web: Automatically Categorizing Search Results," Proceedings of the SIGCHI Conference on Human Factors in Computing Systems, Apr. 1-6, 2000, pp. 145-152.

Close 'n' Forget Firefox add on, Evilfantasy's blog, http://evilfantasy.wordpress.com/2009/03/24/close-%E2%80%98n%E2%80%99-forget-firefox-add-on/, retrieved Mar. 24, 2009, 1 page.

\* cited by examiner

```
1  <html>
2  <head>
3    <script type="text/javascript">
4      function badFunction () {
5        [malicious program statement];
6      }
7      function goodFunction() {
8        alert("Thanks for visiting");
9      }
10   </script>
11 </head>
12 <body>
13   <a href="http://www.adnetwork.com/1234" onFocus=badFunction();>
14     <img src="http://www.adnetwork.com/1234/1234.jpg">
15   </a>
16   <h1>Welcome to XYZWebsite</h1>
17   <br />
18   Search Website:
19   <br />
20   <input onFocus=badFunction();>
21   <hr />
22   Links:
23     <a href="http://www.badsite.com>Help</a>
24     <a href="http://www.xyzwebsite.com/contact>Contact Us</a>
25 </body>
26 </html>
```

*Fig. 7B.*

```
1   <html>
2   <head>
3   <script type="text/javascript">
4          function goodFuntion() {
5                  alert("Thanks for visiting");
6          }
7   </script>
8   </head>
9   <body>
10  <!--<a href="http://www.adnetwork.com/1234" onFocus=badFunction();>-->
11          <img src="http://www.provider.com/temp/987.jpg">
12  <!--</a>-->
13  <h1>Welcome to XYZWebsite</h1>
14  <br />
15  Search Website:
16  <br />
17  <img src="http://www.provider.com/lockedTextBox.jpg">
18  <hr />
19  Links: Help
20          <a href="http://www.xyzwebsite.com/contact>Contact Us</a>
21  </body>
22  </html>
```

*Fig. 7D.*

```
1  <html>
2    <head>
3      <script type="text/javascript">
4        //function badFunction () {
5        //   //[malicious program statement];
6        //}
7        function goodFunction() {
8           alert("Thanks for visiting");
9        }
10     </script>
11   </head>
12   <body>
13     <h1>Credit Card Account Access</h1>
14     <br />
15     Please provide your credit card information
16     <br />
17     Card Number:<a href="http://www.provider.com/phishing">
18        <img src="http://www.provider.com/phishingAlert.jpg"></a>
19     Expiration:<a href="http://www.provider.com/phishing">
20        <img src="http://www.provider.com/phishingAlert.jpg"></a>
21   </body>
22 </html>
```

*Fig. 7F.*

SELECTIVE DISABLING OF CONTENT PORTIONS

BACKGROUND

A network resource such as a web page or other network-accessible content item may be associated with a number of additional resources, such as images or videos to be displayed or scripts to be executed. Software on a client computing device, such as a browser software application, typically processes embedded resource identifiers to generate requests for the content. In many cases, two or more distinct hosts or other content providers will provide client computing devices with resources associated with a single web page.

Resources embedded within or referenced by the web page may be harmful to the client computing device. For example, a web page may contain executable code that alters the state of the client computing device or collects sensitive information about the user. The executable code may have originated from a separate content source, unrelated to the provider of the web page, such as an advertising network. Existing services that warn users of potential risks associated with a requested web page can help prevent receipt of such harmful resources, but also frequently block the remainder of the web page, which may be safe. A user that deems some portion of the requested content to be important may choose to ignore such warnings in order to access the web page, thereby receiving the potentially harmful resource.

BRIEF DESCRIPTION OF THE DRAWINGS

Embodiments of various inventive features will now be described with reference to the following drawings, wherein:

FIG. 7B is source code diagram depicting illustrative source code for the browse session content of FIG. 7A;

FIG. 7D is a source code diagram depicting illustrative source code for the browse session content of FIG. 7C;

FIG. 7F is a source code diagram depicting illustrative source code for the browse session content of FIG. 7E;

DETAILED DESCRIPTION OF SPECIFIC EMBODIMENTS

Figure 1A:
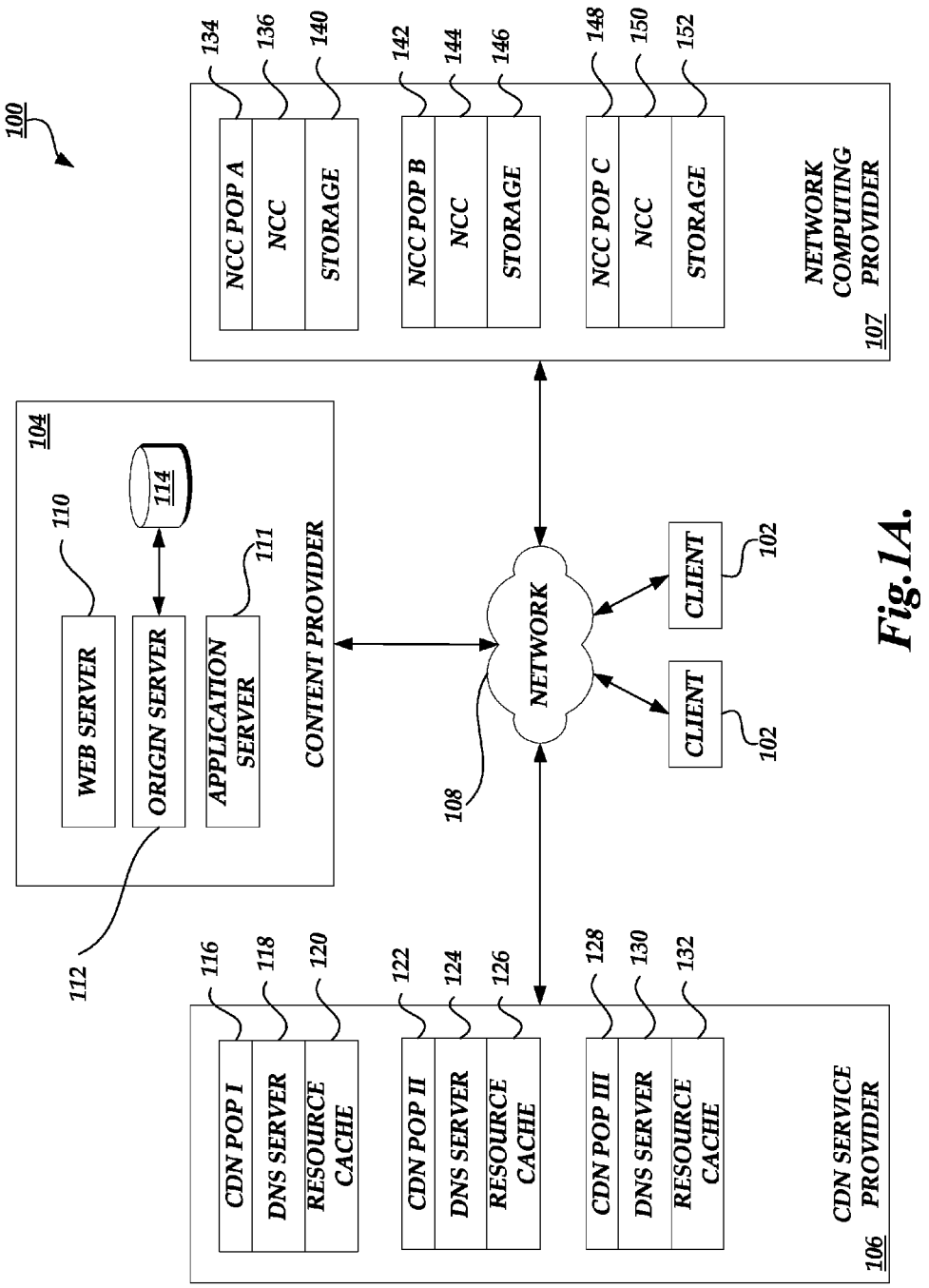
FIG. 1A is a block diagram illustrative of a content delivery environment including a number of client computing devices, content provider, a content delivery network service provider, and a network computing provider.

The present disclosure is directed to detecting and disabling potentially harmful items that are embedded within or referenced by retrievable network resources, such as web pages and other types of documents. Specifically, aspects of the disclosure will be described with regard to the comparison, by a network computing component, of content portions to a repository of content portions which are known or predicted to be harmful, or to a blacklist of resources which are known or predicted to be harmful. The network computing component can take preventative action based on the nature of the threat and the nature of the resource. For example, the network computing component can modify or remove portions of source code, replace interactive content with static images, and/or disable objects. Other aspects of the present disclosure relate to providing users with a mechanism to override the preventative measures and receive the original unprocessed content. The network computing component can monitor the user overrides and fine tune its detection of harmful content.

The remainder of the disclosure is arranged generally as follows. An example content delivery environment will be described with reference to FIGS. 1A, 2 to 6, and 8 to 11. The disclosed content delivery environment represents one non-limiting example of an environment in which the disclosed harmful content detection and disabling features may be implemented. Portions of this disclosure of the example content environment are bodily incorporated from U.S. patent application Ser. No. 13/174,589, the disclosure of which is hereby incorporated by reference. Following the description of the example environment, the various navigation and behavioral analysis features will be described with reference to FIGS. 1B, 7A to 7F, and 12. Although aspects of the embodiments described in the disclosure will focus, for the purpose of illustration, on the processing by a network computing component, such as an intelligent proxy server, application server, or other network node, one skilled in the art will appreciate that the techniques disclosed herein may be applied to any number of hardware or software processes or applications.

With reference to an illustrative embodiment, a user of a client computing device can launch a software browser application (browser) and issue requests for network resources, such as web pages, images, videos, applets, documents, and other content pages. Rather than issue the requests directly to the content provider or other content source, as may happen in a typical environment, the request can be issued to an intermediary entity, such as a network computing provider configured to provide additional processing features and capabilities, such as harmful content detection and protection. The network computing provider may have any number of network computing components (NCCs), such as web servers, proxy servers, application servers, and the like.

An NCC can receive, from a client computing device, a request for a web page. The NCC can launch a virtual machine instance to process the request, retrieve the requested resources, and process the retrieved resources. In some embodiments, the virtual machine instance can include a browser or other content rendering engine configured to perform the same or similar processing to web pages as the browser application on the client computing device. For example, the browser of the NCC can have the same or a similar content rendering engine, JavaScript engine, etc. as the browser of the client computing device, but may not display the rendered pages on a screen due to the nature of the NCC, which may not have a dedicated display. The NCC can retrieve the requested web page, and determine which processing actions are to be performed by the browser at the NCC and which are to be performed by the browser at the client computing device. The NCC can then perform any processing actions assigned to the NCC, and transmit a response to the client computing device.

In addition, the NCC can analyze each resource, or each portion of a complex resource such as a web page, to determine whether the resource may be harmful. The NCC can have access to a repository of harmful content signatures that the NCC can compare the retrieved resources against in order to determine whether the resource may be harmful. This procedure can aid in identifying harmful content prior to the requested resource being transmitted to the client computing device, and in some cases prior to such content being executed by the browser of the NCC. In response to finding a signature of harmful content in a resource, the NCC can take proactive measures to prevent the harmful resource from affecting other resources or the client computing device. For example, the NCC can remove portions of executable code, replace content with static images, and/or disable interactive objects and controls. The NCC can then send a processed response to the requesting client computing device.

The client computing device can be provided with the capability of overriding security measures applied by the NCC. For example, the NCC may modify the web page to include a link or other control that is selectable to retrieve or access the disabled content, or the browser on the client computing device may have functionality for enabling a user to do so, such as a toolbar button or menu option. If a user trusts an interactive object that the NCC has disabled, such as a credit card number entry field, the user can enable the field. The NCC can then transmit the original, unprocessed object to the client. Furthermore, data regarding the override can be stored by the NCC, which can use historical override data to tune the sensitivity of its harmful content detection processes and to correct erroneous or out-of-date signatures.

FIG. 1A is a block diagram illustrative of a networked computing environment 100 for the management and processing of content requests. As illustrated in FIG. 1A, the networked computing environment 100 includes a number of client computing devices 102 (generally referred to as clients) for requesting content and content processing from a content provider 104, CDN service provider 106, or network computing provider 107. In an illustrative embodiment, the client computing devices 102 can corresponds to a wide variety of computing devices including personal computing devices, laptop computing devices, hand-held computing devices, terminal computing devices, mobile devices (e.g., mobile phones, tablet computing devices, etc.), wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. The client computing devices 102 may have varied local computing resources such as central processing units and architectures, memory, mass storage, graphics processing units, communication network availability and bandwidth, etc.

The networked computing environment 100 can also include a content provider 104 in communication with the one or more client computing devices 102 or other service providers (e.g., CDN service provider 106, network computing provider 107, etc.) via the communication network 108. The content provider 104 illustrated in FIG. 1A corresponds to a logical association of one or more computing devices associated with a content provider. Specifically, the content provider 104 can include a web server component 110 corresponding to one or more server computing devices for obtaining and processing requests for content (such as Web pages) from the client computing devices 102 or other service providers. The content provider 104 can further include an origin server component 112 and associated storage component 114 corresponding to one or more computing devices for obtaining and processing requests for network resources from the CDN service provider. The content provider 104 can still further include an application server computing device 111, such as a data streaming server, for processing streaming content requests. One skilled in the relevant art will appreciate that the content provider 104 can be associated with various additional computing resources, such as additional computing devices for administration of content and resources, DNS name servers, and the like. For example, although not illustrated in FIG. 1A, the content provider 104 can be associated with one or more DNS name server components that would be authoritative to resolve client computing device DNS queries corresponding to a domain of the content provider.

With continued reference to FIG. 1A, the networked computing environment 100 can further include a CDN service provider 106 in communication with the one or more client computing devices 102 and other service providers via the communication network 108. The CDN service provider 106 illustrated in FIG. 1A corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102. Each CDN POP 116, 122, 128 also includes a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1A as logically associated with the CDN service provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like.

With further continued reference to FIG. 1A, the networked computing environment 100 can also include a network computing provider 107 in communication with the one or more client computing devices 102, the CDN service provider 106, and the content provider 104 via the communication network 108. The network computing provider 107 illustrated in FIG. 1A also corresponds to a logical association of one or more computing devices associated with a network computing provider. Specifically, the network computing provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as data streaming applications, via a number of instances of a virtual machine, generally referred to as an instance of an NCC. One skilled in the relevant art will appreciate that NCC 136, 144, 150 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 134, 142, 148 also includes a storage component 140, 146, 152 made up of a number of storage devices for storing any type of data used in the delivery and processing of network or computing resources, including but not limited to user data, state information, processing requirements, historical usage data, and resources from content providers that will be processed by an instance of an NCC 136, 144, 150 and transmitted to various client computers, etc. The NCCs 136, 144, 150 and the storage components 140, 146, 152 may further include additional software and/or hardware components that facilitate communications including, but not limited to, load balancing or load sharing software/hardware components for selecting instances of a virtual machine supporting a requested application and/or providing information to a DNS nameserver to facilitate request routing.

In an illustrative embodiment, NCCs 136, 144, 150 and the storage components 140, 146, 152 are considered to be logically grouped, regardless of whether the components, or portions of the components, are physically separate. For example, a network computing provider 107 may maintain separate POPs for providing the NCC and the storage components. Additionally, although the NCC POPs 134, 142, 148 are illustrated in FIG. 1A as logically associated with a network computing provider 107, the NCC POPs will be geographically distributed throughout the communication network 108 in a manner to best serve various demographics of client computing devices 102. Additionally, one skilled in the relevant art will appreciate that the network computing provider 107 can be associated with various additional computing resources, such additional computing devices for administration of content and resources, and the like. Even further, one skilled in the relevant art will appreciate that the components of the network computing provider 107 and components of the CDN service provider 106 can be managed by the same or different entities.

Figure 1B:
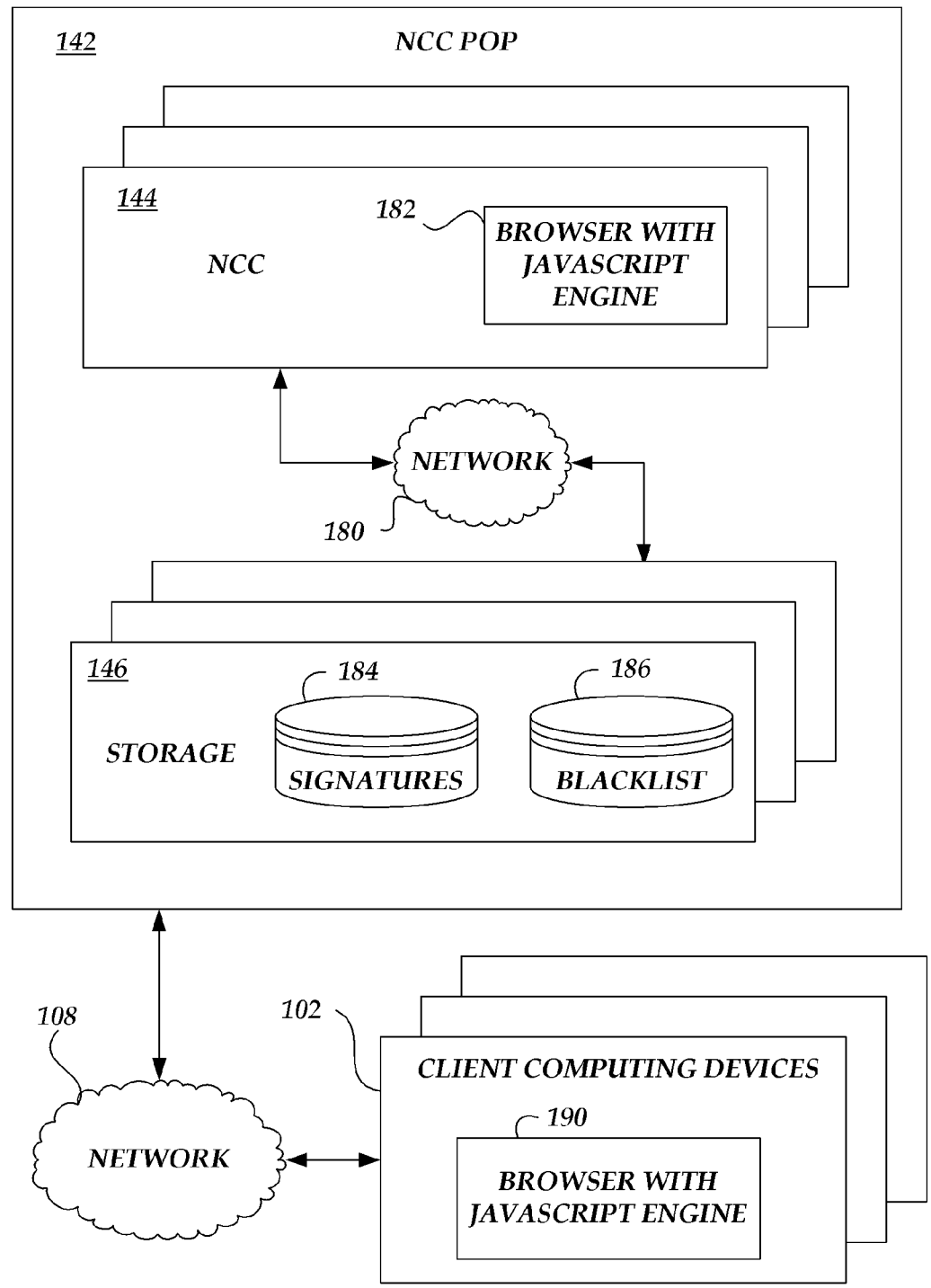
FIG. 1B is a block diagram illustrative of a network computing component point-of-presence in communication with a client computing device.

FIG. 1B is a block diagram schematically illustrating an example of an NCC POP 142, described above with respect to FIG. 1A, that can provide computing resources to multiple client computing devices 102 via a communication network 108. For example, and as described in detail herein, the NCC POP 142 can include any number of NCCs 144 to manage requests from a client computing device 102. An NCC 144 can retrieve a network resource, such as a web page, image, video file, applet, animation, document, or other content object of a web site, from a content source, such as a content provider 104 or CDN service provider 106 as illustrated in FIG. 1A. In addition, the NCC 144 can be configured to determine browsing configurations, which can distribute the processing of network resources between the NCC 144 and the requesting client computing device 102. The NCC 144 can be configured with a browser component 182 that can perform some or all of the processing actions that may typically be performed by a browser 190 on a client computing device 102. For example, the browser component 182 of the NCC 144 can include a JavaScript engine for compiling and executing JavaScript code embedded in web pages. Under some browsing configurations, the NCC 144 can process some or all of the requested network resource, either exclusively or in parallel with the client computing device 102. The result of such browsing configurations can be an improvement in performance, speed, reliability, privacy, etc., when compared to the client computing device 102 processing the network resources exclusively.

The NCC POP 142 can include any number of storage components 146, which may include one or more non-transitory storage devices. The storage components 146 can be configured to store signatures 184 of harmful content, and blacklists 186 of web sites and other content providers known to distribute harmful or potentially harmful content. The NCCs 144 and storage components 146 can communicate with each other over a network 180. The network 180 may, for example, be a publicly accessible network of linked networks, possibly operated by various distinct parties, such as the Internet. In other embodiments, the network 180 may be a private network, such as, for example, a corporate or university network that is wholly or partially inaccessible to non-privileged users. In still other embodiments, the network 180 may include a private network, personal area network, local area network, wide area network, or combination thereof, each with access to and/or from the Internet.

In operation, a user of a client computing device 102 can use a browser 190 to request a network resource, such as a web page. As described herein, the request can be transmitted to a an NCC POP 142 of a network computing provider 107 instead of directly to a content source, and the NCC 144 can retrieve and process the requested web page, and transmit the requested page (or a modified version of it) to the client computing device 102. Processing the requested web page can include analyzing the retrieved resources to determine if they may be harmful the client computing device 102. To facilitate detection of harmful content, the NCC 144 can access the harmful content signatures 184 and blacklist 186 on the storage component 146. Generally, the NCC 144 can detect matches between portions of retrieved content and one or more harmful content signatures 184, or between the source of the retrieved content and an entry in the blacklist 186. In some embodiments, the NCC 144 can perform such detection prior to retrieving the content, such as by checking the blacklist 186 for a requested resource.

In response to detecting harmful content, the NCC 144 can modify the content to remove the harmful portion, such as by removing executable code or not including the executable code in the response to the requesting client computing device 102. In another example the NCC 144 can disable harmful objects, such as by modifying an object's settings to make the object read-only. In a further example, the NCC 144 can render the harmful portion within the NCC's 144 browser 182. The NCC 144 can then create a non-harmful visual representation, such as a static image, of the rendered harmful portion. In some cases, rendering the harmful content in the browser 182 can include executing potentially harmful code with the associated JavaScript engine. This may be beneficial prior to creating a static image of the harmful portion, because in some cases the visual portion of a web page is built dynamically in the browser though the use of JavaScript.

The processed resources, including any portions modified to reduce potential harm to the client computing device 102, can be transmitted by the NCC 144 in a response to the client computing device 102. The client computing device 102 can perform any remaining processing actions with the browser 190, according to the browsing configuration determined by the NCC 144. Because harmful portions have been removed or disabled by the NCC 144, the user of the client computing device 102 can interact with the received web page, and view each portion (or each remaining portion) of the web page, even though one or more portions were detected to be harmful by the NCC 144. For example, one or more portions of executable code, such as JavaScript, may have been detected to be harmful by the NCC 144. Rather preventing the user from accessing the web page at all, or stripping all of the JavaScript from the web page, or otherwise disabling JavaScript for the entire web page, only the harmful portions have been removed. Therefore, JavaScript which has been embedded into the web page to facilitate interactivity or to render the page within the browser 190 of the client computing device 102 may be preserved and permitted to execute. Such a solution can provide the user with access to desired content from potentially harmful sources, while preserving the safety or performance of client computing device 102 by modifying, disabling, or removing the harmful portions. Harmful content can include intentionally harmful content, such as malicious code or phishing attacks, and unintentionally harmful content, such as poorly designed code that may consume excess resources or otherwise affect the performance of the client computing device or the experience of the user.

The user may, in some embodiments, override the security measures implemented by the NCC 144. For example, the user can override the blocking or disabling of content items that the user trusts, or which the user deems to be worth a potential security risk. In some embodiments, the harmful content blocked or disabled by the NCC 144 may include data entry fields. If a user determines that interacting with the data entry field is necessary or desirable even though it is potentially harmful, the user can override the block implemented by the NCC 144. In another example, the NCC 144 may determine that a large video file will start buffering and playing automatically when a web page is loaded into the client browser 190, and that downloading the video file will consume substantial resources and adversely affect the user's experience. The NCC 144 may initially replace the video with an image, or disable the automatic download and playback of the video. However, a user of the client computing device 102 can override these security measures and view the video, which may be the primary reason that the user has accessed the web page.

Data reflective of user overrides can be transmitted to the NCC 144. In some cases, the data will be transmitted to the NCC 144 because the user desires the NCC 144 to transmit a blocked resource to the client computing device 102. In such circumstances, the NCC 144 would receive data reflecting the override in the request to access the blocked object. Other scenarios, such as starting video playback when the NCC 144 disabled auto playback, may not inherently involve transmission of data to the NCC 144. In such cases, the browser 190 can be configured to transmit override data to the NCC 144 so that the NCC 144 can later user the override data to fine tune its harmful content determinations. For example, the NCC 144 may aggregate override data, and when a number of users exceeding an acceptable threshold have overridden a security measure, the NCC 144 can suspend performing the security measure for the specific content item. In another example, the NCC 144 can use historical override data to recognize when a user is accessing a web page for which it already initiated an override. In such cases the NCC 144 can be configured to include the harmful content item in the response rather than disable or block it. The NCC 144 may encode the response so that the user is visually alerted to the harmful item, such as with a highlight or recognizable border. Therefore, the user can be alerted to the harmful item while still being able to interact with and consume it as though the NCC 144 did nothing.

With reference now to FIGS. 2-6, the interaction between various components of the networked computing environment 100 of FIG. 1A will be illustrated. Specifically, FIGS. 2-6 illustrate the interaction between various components of the networked computing environment 100 for the exchange of content between a client computing device 102 and a content provider 104 via the network computing provider 107. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
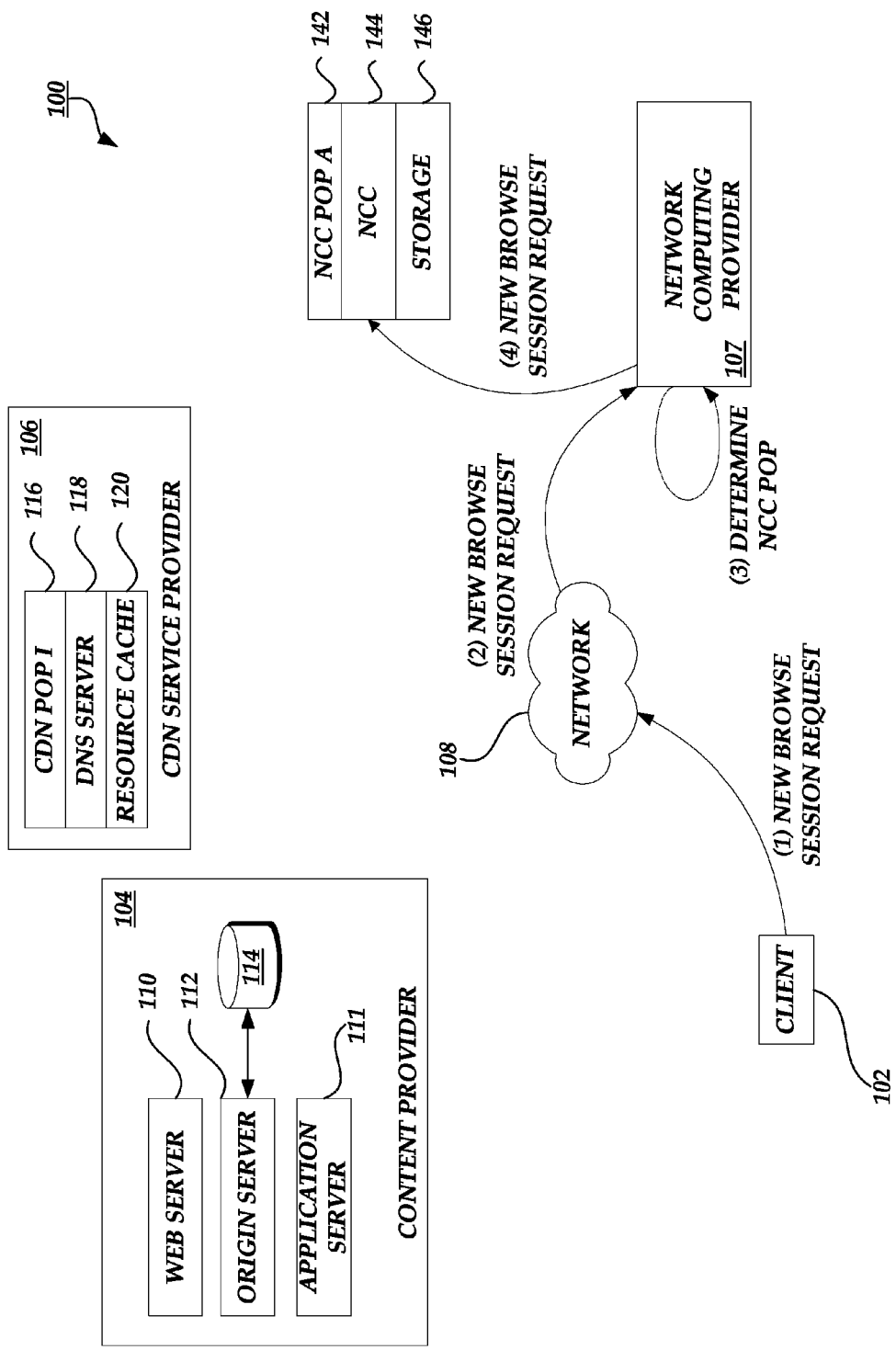
FIG. 2 is a block diagram of the content delivery environment of FIG. 1A illustrating the generation and processing of a new browse session request from a client computing device to a network computing provider.

With reference to FIG. 2, the process can begin with the generation and processing of a browse session request from a client computing device 102 to a network computing provider 107 will be described. Illustratively, the client computing device 102 may load a browser for viewing network content in response to an event or user request. Subsequent to the browser being loaded, the browser may be implemented to request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. As illustrated in FIG. 2, the browse session request is transmitted first to a network computing provider 107. In an illustrative embodiment, the network computing provider 107 utilizes a registration application program interface ("API") to accept browse session requests from the client computing device 102. The browse session request can include network address information corresponding to a requested network resource, which may be in any form, including, but not limited to, an Internet Protocol ("IP") address, a URL, a Media Access Control ("MAC") address, etc.

Subsequent to the receipt of the browse session request, the network computing provider 107 may select an associated network computing component (hereinafter "NCC") point of presence (hereinafter "POP") such as NCC POP 142 to service the browse session request. The selection of the NCC POP may determine the processing and network resources available to the instantiated virtual machine. The selection of processing and network resources and the provisioning of software at the NCC POP instance may be done, at least in part, in order to optimize communication with content providers 104 and client computing devices 102.

Figure 3:
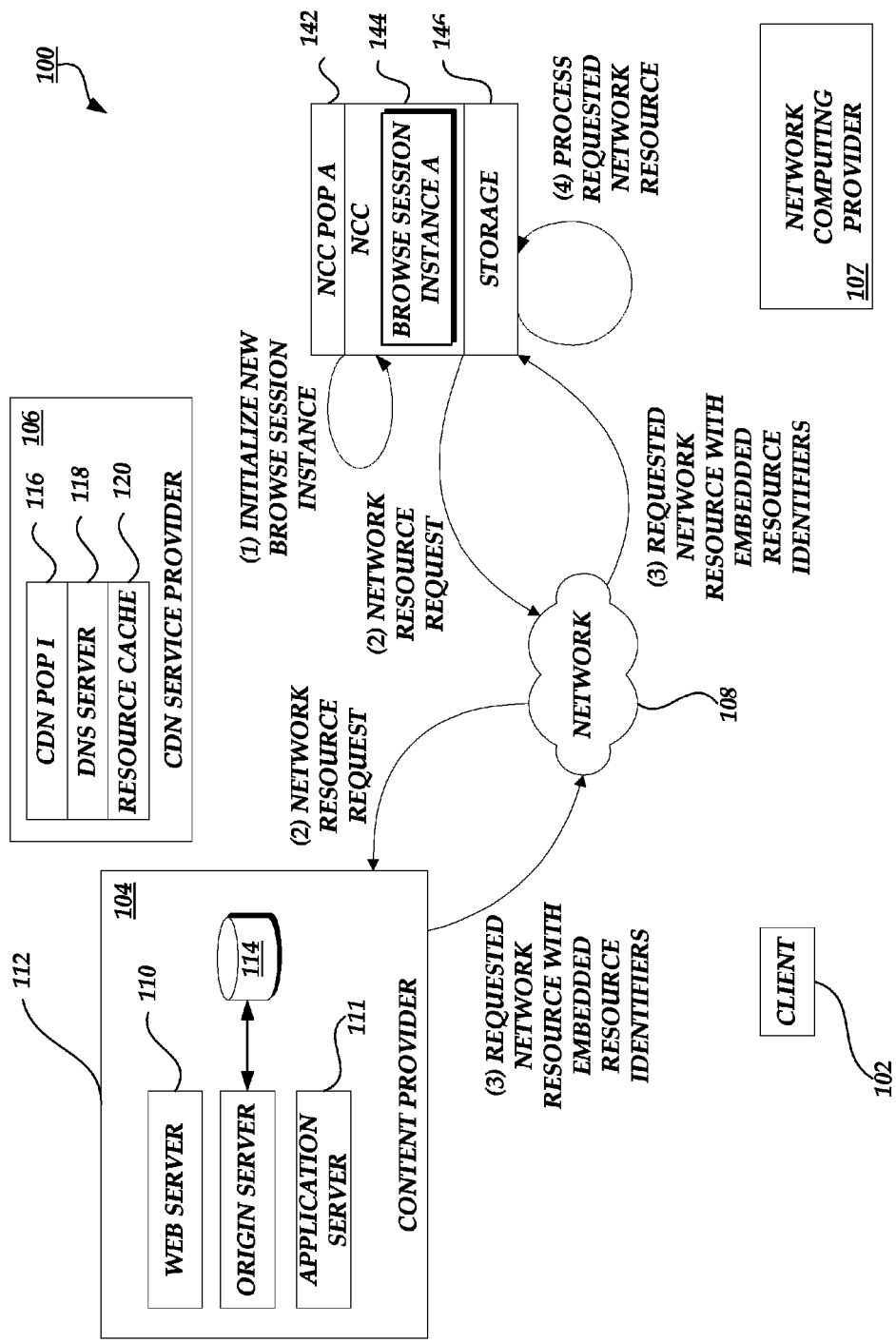
FIG. 3 is a block diagram of the content delivery environment of FIG. 1A illustrating the generation and processing of a request for a network resource from a network computing provider to a content provider.

With reference to FIG. 3, an illustrative interaction for generation and processing of a request for a network resource from a network computing provider 107 to a content provider 104 will be described. As illustrated in FIG. 3, the selected NCC POP 142 may generate a browse session corresponding to one or more content providers based on a browse session request, such as the illustrative browse session request depicted in FIG. 2 above. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session.

Subsequent to initializing a new browse session instance, NCC POP 142 may provide a request for a network resource to a content provider 104 based on a network address included in the browse session request. For example, a browse session request may include a URL for a Web page, such as "http://www.xyzsite.com/default.htm." NCC POP 142 may resolve the URL to an IP address through a DNS resolver associated with the network computing provider (not shown), and may request the Web page from the content provider 104 at the resolved IP address. In various embodiments, a network resource may be retrieved from any combination of content providers, content delivery network (hereinafter "CDN") servers, or caches associated with the network computing provider 107. For example, the network computing provider may check if a resource is stored in a local cache or in another server or service provider associated with the network computing provider 107. If a network resource is stored in a local or associated location, the NCC POP 142 may retrieve the network resource from the local or associated location rather than from the third party content provider 104 or CDN service provider 106. Illustratively, the NCC POP 142 may provide requests for any number of network resources as included in the browse session request, and may obtain these network resources from any number of different sources, sequentially or in parallel.

As illustrated in FIG. 3, the content provider 104 receives the resource request from the NCC POP 142 and processes the request accordingly. In one embodiment, the content provider 104 processes the resource request as if it were originally provided by the client computing device 102. For example, the content provider 104 may select the type of content, ordering of content, or version of content according to the requirements of the requesting client computing device 102. In another embodiment, the content provider 104 may be provided with information that provides information associated with the NCC POP 142 for utilization in providing the requested content (e.g., an available amount of processing resources or network bandwidth).

Subsequent to obtaining the requested network resource from the content provider 104 (or other source designated by the content provider), the NCC POP 142 may process the network resource to extract embedded resource identifiers and gather information for determination of a remote session browsing configuration. For example, a network resource such as a Web page may include embedded CSS style information and Javascript as well as embedded resource identifiers to additional resources such as text, images, video, audio, animation, executable code, and other HTML, CSS, and Javascript files. In the process of extracting the embedded resource identifiers, the NCC POP 142 may gather information about the processed network resources for later use in the determination of a remote session browsing configuration as discussed below with reference to FIG. 4.

Figure 4:
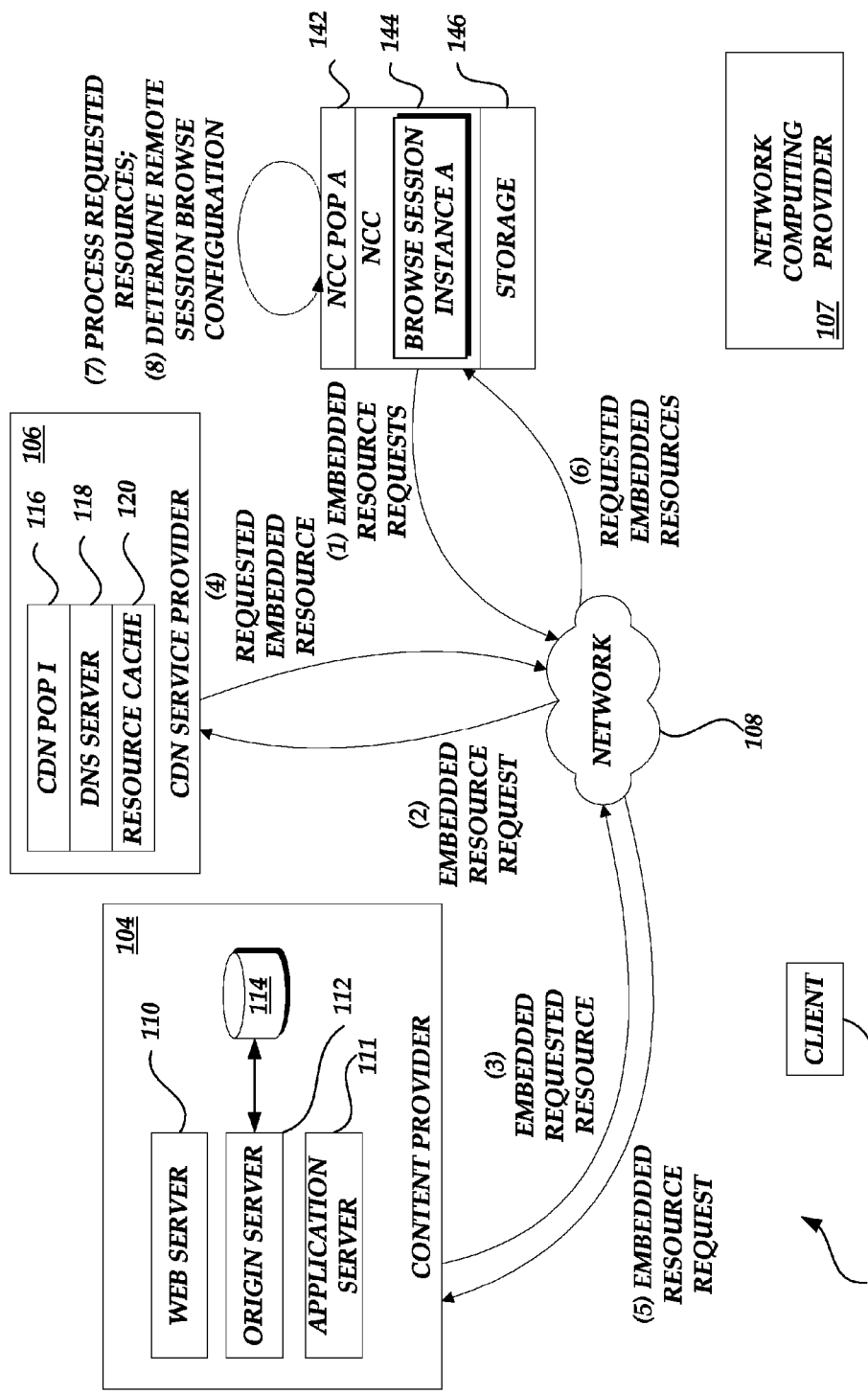
FIG. 4 is a block diagram of the content delivery environment of FIG. 1A illustrating the generation and processing of one or more requests corresponding to one or more embedded resources from a network computing provider to a content provider and content delivery network.

With reference to FIG. 4, an illustrative interaction for generation and processing of one or more requests corresponding to one or more embedded resources from a network computing provider to a content provider and content delivery network is disclosed. As illustrated in FIG. 4, the selected NCC POP 142 may provide resource requests to one or more sources of content such as content provider 104 and CDN POP 116. The resource requests may correspond to embedded resources based on one or more embedded resource identifiers extracted from a requested network resource (e.g., a Web page) as described in FIG. 3 above. In various embodiments, embedded resources may be retrieved from any combination of content providers, CDN servers, or caches associated with the network computing provider 107. For example, the network computing provider may check if an embedded resource is stored in a local cache or in another server or service provider associated with the network computing provider 107. If an embedded resource is stored in a local or associated location, the NCC POP 142 may retrieve the embedded resource from the local or associated location rather than the third party content provider or CDN. Illustratively, the NCC POP 142 may provide requests for any number of embedded resources referenced by a network resource, and may obtain these embedded resources from any number of different sources, sequentially or in parallel. Subsequent to obtaining the requested resources, the NCC POP 142 may process the resources and requested content to determine a remote session browsing configuration for the processing and communication of content to the client computing device 102.

Figure 5:
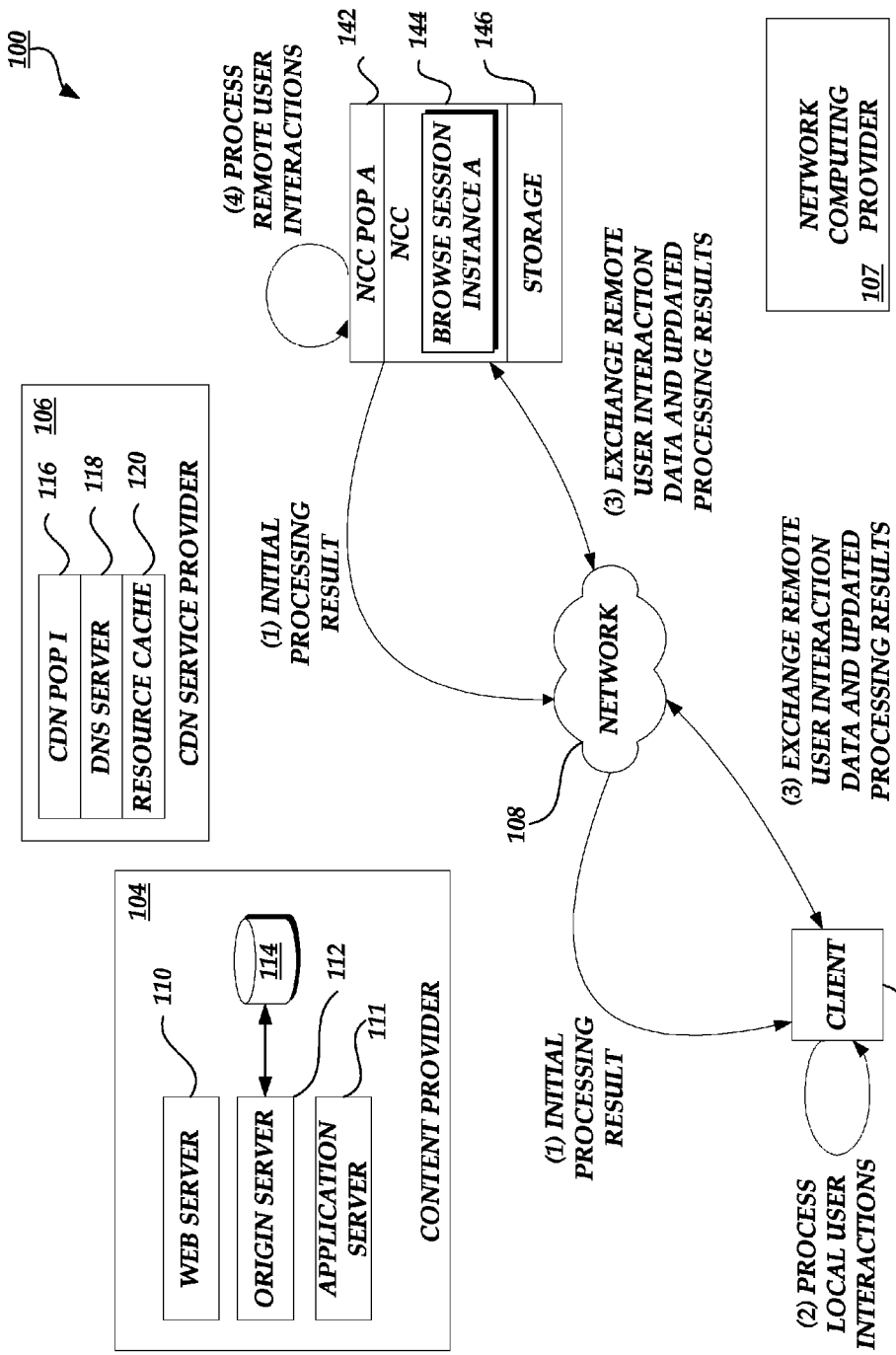
FIG. 5 is a block diagram of the content delivery environment of FIG. 1A illustrating the generation and processing of browse session data and user interaction data between a network computing provider and client computing device.

With reference to FIG. 5, an illustrative interaction for generation and processing of processing results and user interaction data between a network computing provider and client computing device is disclosed. As previously described, in one embodiment, the respective browsers on the instantiated network computing component and the client computing device 102 can exchange browsers' session information related to the allocation and processing of the requested resources at the instantiated network computing component and client computing device. As illustrated in FIG. 5, the selected NCC POP 142 may provide an initial processing result to the client computing device 102 over the network 108. The initial processing result may correspond to requested network content, such as a Web page, along with associated embedded resources processed by the NCC POP 142 in accordance with a selected remote session browsing configuration as described in FIG. 4 above. The NCC POP 142 also detects whether any resources or portions thereof may be harmful, as identified by the harmful content signatures and blacklist in the storage 146, and processes any detected harmful resources. Additionally, the NCC POP 142 also makes a determination of which additional processes will be conducted at the NCC POP 142, at the client computing device 102, or both. Subsequent to receiving an initial processing result and the allocation of processes, the client computing device 102 may perform any remaining processing actions on the initial processing result as required by the selected remote session browsing configuration, and may display the fully processed content in a content display area of a browser. The client computing device 102 may process any local user interactions with local interface components or content elements locally, and may provide user interactions requiring remote processing to the network computing provider 107. For example, the client computing device 102 may transmit, to the NCC POP 142, an override of a disabled resource. The network computing provider 107 may provide updated processing results to the client computing device in response to changes to the content or remote user interaction data from the client computing device, for example the original enabled resource in response to the override.

Figure 6:
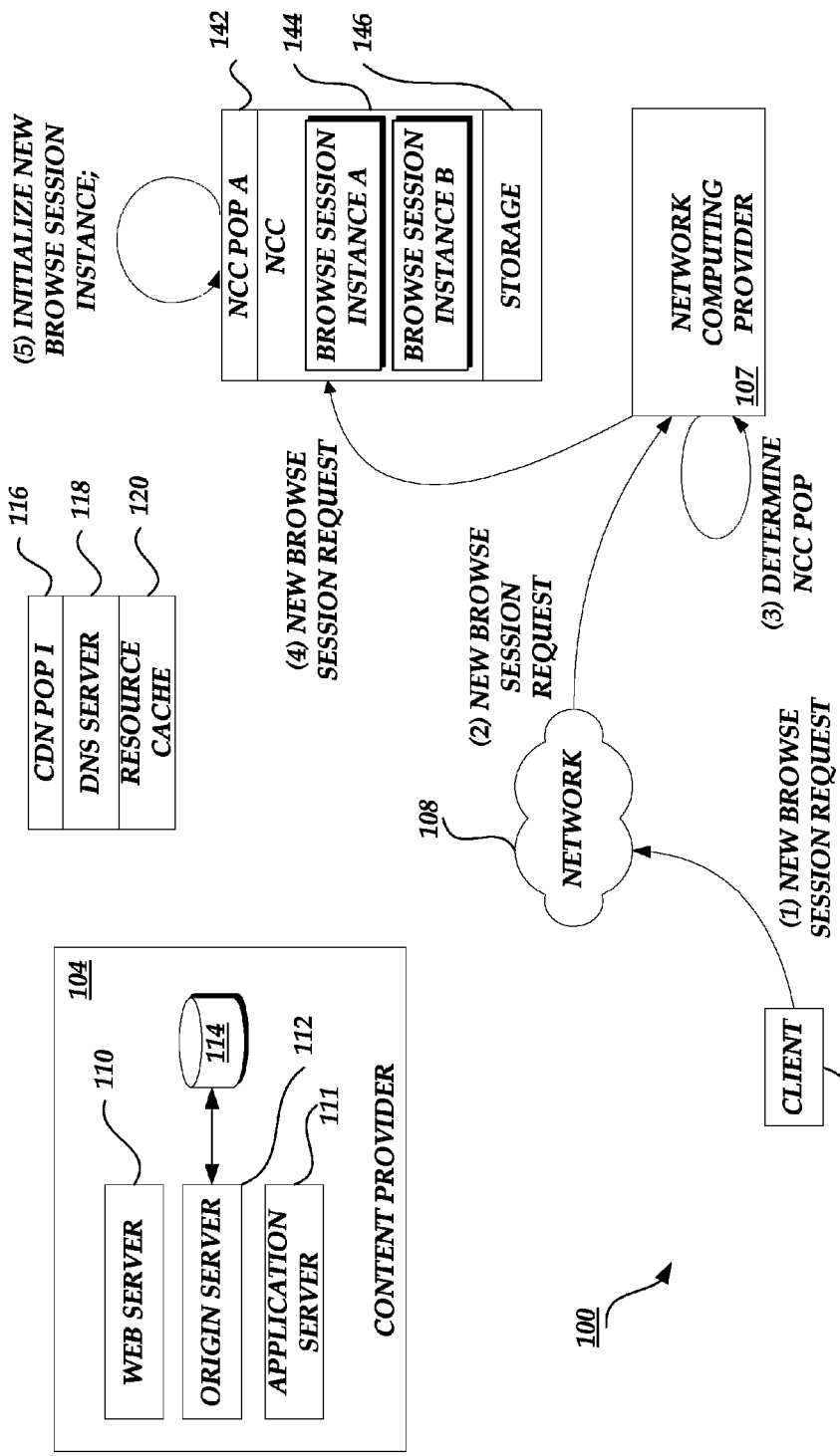
FIG. 6 is a block diagram of the content delivery environment of FIG. 1A illustrating the generation and processing of an additional new browse session request from a client computing device to a network computing provider.

With reference to FIG. 6, a block diagram of the content delivery environment of FIG. 1A illustrating the generation and processing of an additional new browse session request from a client computing device to a network computing provider is disclosed. As illustrated in FIG. 6, a second new browse session request may be sent to network computing provider 107 from client computing device 102 across network 108. In an illustrative embodiment, the network computing provider 107 utilizes a registration API to accept browse session requests from the client computing device 102.

The additional browse session request may be generated by a client computing device 102 in response to a user opening up a new browser window with a new content display area, opening a new content display area in an existing browser window (e.g., opening a new tab in a browser), requesting new network content in an existing content display area (e.g., following a link to a new network resource, or entering a new network address into the browser), or any other user interaction. For example, a user browsing a first Web page corresponding to a first browse session instance may follow a link that opens a new tab or browser window to view a second Web page. In one embodiment, any required steps of obtaining and processing content associated with the second Web page may be performed by the currently instantiated network computing component in which the browser can handle the processing of both resource requests. In another embodiment, the client computing device 102 request may be processed as a new browse session request to the network computing provider 107, including the network address of the second Web page. In this embodiment, the browser on the client computing device may not specifically request a separate browse session, and a user's interaction with the browser on the client computing device 102 may appear to be part of a same browsing session. As described above with regard to FIGS. 2 and 3, the network computing provider 107 may cause an instantiation of a network computing component for obtaining and processing content associated with the second web page. In other embodiments, a new browse session request may be generated by the client computing device 102 corresponding to sections of a network resource (e.g., frames of a Web page), individual network resources, or embedded resources themselves, data objects included in a set of content, or individual network resources.

Illustratively, the additional browse session request may include any number of pieces of data or information including, but not limited to, information associated with a user, information associated with the client computing device 102 (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. Requested content may include any manner of digital content, including Web pages or other documents, text, images, video, audio, executable scripts or code, or any other type of digital resource.

Subsequent to the receipt of the browse session request, the network computing provider 107 may select an associated network computing component such as NCC POP 142 to service the browse session request. As discussed above with reference to FIG. 2, a network computing provider 107 may select an NCC POP to service a browse session request based on any number of factors, including, but not limited to available NCC POP resources (e.g., available memory, processor load, network load, etc), a financial cost of servicing the browse session request at the NCC POP, the NCC POP location respective to a client computing device 102, content provider 112, or CDN POP 116, a NCC POP cache status (e.g., whether a requested resource is already stored in an NCC POP cache), etc. In one embodiment, the network computing provider 107 may select a number of NCC POPs to service a browse session request. Illustratively, although the network computing provider 107 is depicted here for purposes of illustration as selecting NCC POP 142, the network computing provider 107 may select any extant NCC POP to service the browse session request. For example, a single client computing device 102 may simultaneously or sequentially provide three different browse session requests to the network computing provider 107 corresponding to different network resources. The network computing provider 107 may select different NCC POPs for each browse session request, the same NCC POP for all three browse session requests, or any combination thereof. As discussed above, the decision whether to select a different NCC POP than was utilized for a previous or simultaneous browse session request may be made on the basis of available system resources, randomly, or according to any other factor as discussed above and with regards to FIG. 2.

Figure 7A:
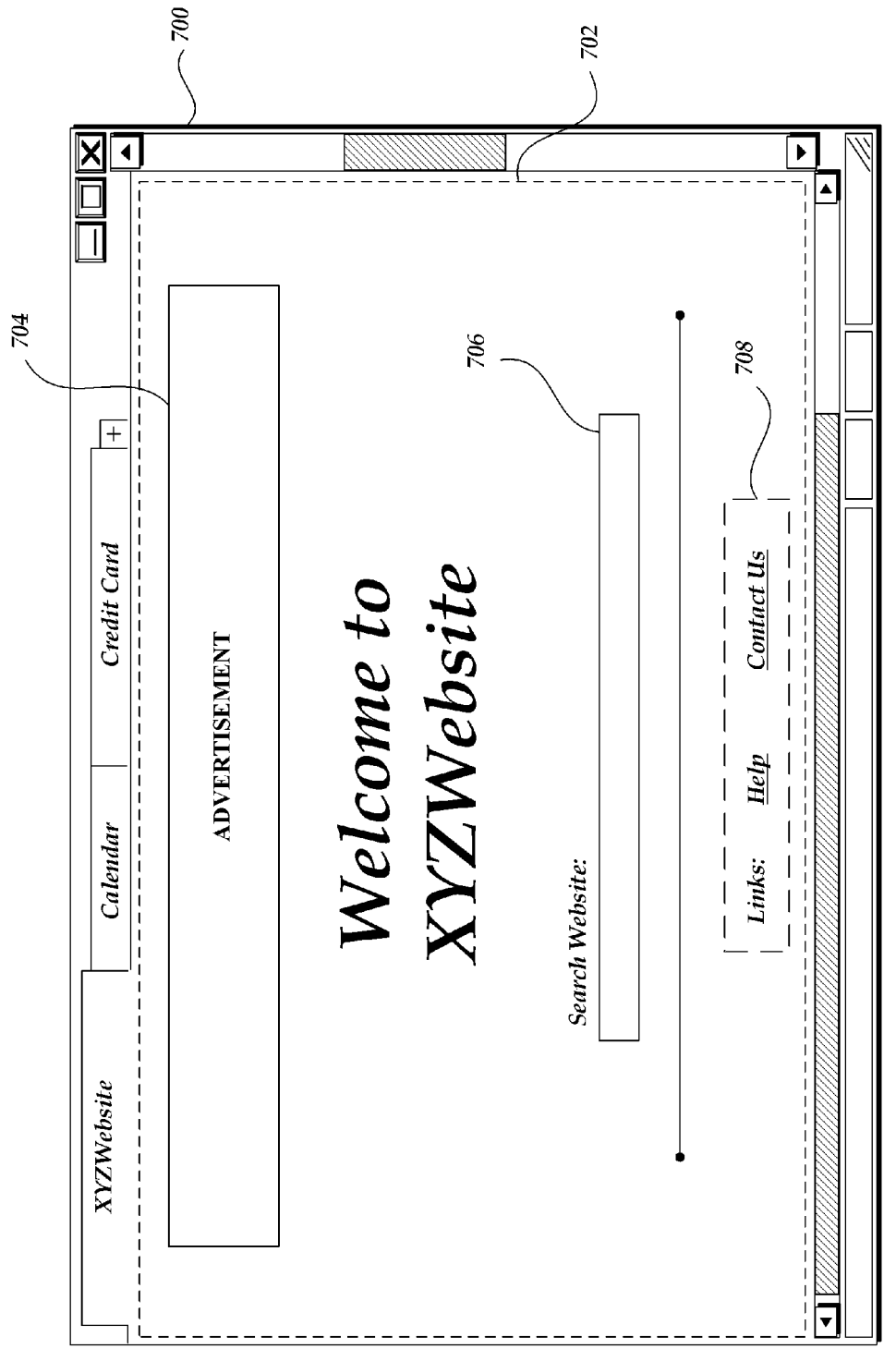
FIG. 7A is a user interface diagram depicting an illustrative browser interface and display of browse session content.

FIG. 7A is a user interface diagram depicting an illustrative browser interface and display of browse session content. As described above with reference to FIG. 5, a browser 700 may have a content display area 702, as well as one or more one or more local interface components. These local interface components may include toolbars, menus, buttons, address bars, scroll bars, window resize controls, or any other user interface controls. Illustratively, local interface components may be displayed as separate from the content display area or may be overlaid or embedded in the content display area. Additionally, the content display area 702 may display interactive controls and other components alongside the content items. The content displayed in FIG. 7A includes an advertisement 704, an input control 706, and a link list 708. The items are displayed and fully enabled, with no processing from the NCC POP 142.

Interactions with local interface components may be treated as local user interactions or remote user interactions depending on the processing required by the interaction and the remote session browsing configuration. For example, the selection of a preferences option in a browser menu may be handled entirely as a local user interaction by a browser. The processing required to display the menu, provide visual feedback regarding the selection, display the preferences window, and process the changes made to the browser preferences may be performed locally. As discussed above, processing user interactions locally may provide greater responsiveness at the browser as opposed to sending user interaction data to the NCC POP 142 for processing. As another example, when using a remote session browsing configuration that specifies extensive processing on the NCC POP 142 (e.g., a remote session browsing configuration using a remote session communication protocol such as RDP), the selection of a content refresh button in a browser toolbar may be handled both as a local user interaction and a remote user interaction. The limited processing required to provide interface feedback corresponding to the button selection may be handled at the client computing device 102 in order to provide the appearance of interface responsiveness, while the refresh command, which may require processing of the network content displayed in the content display area of the browser, may be sent as user interaction data to the NCC POP 142 for processing. The NCC POP 142 may then transmit updated processing results corresponding to the refreshed network content back to the client computing device 102 for display.

FIG. 7B is a listing of source code for the content displayed in the browser interface 700 of FIG. 7A. In this example, the content displayed in FIG. 7A is a web page delivered to the client computing device 102 as a hypertext markup language (HTML) document. HTML documents may contain, among other things, viewable content, formatting instructions, and interactive objects. For example, the text that is displayed in the content area 702 of FIG. 7A can be found within the HTML source code of FIG. 7B, such as at lines 16 and 18. Examples of interactive objects which can be coded into the HTML file include input controls and links to other web pages and resources, such as the link definitions at lines 23-34 which correspond to the link list 708, and the input control definition at line 20 which corresponds to the input control 706.

In addition, HTML documents can contain code statements written in other programming languages, such as JavaScript. In a common example, the JavaScript code statements are interpreted or compiled for execution by a JavaScript engine that is embedded in or otherwise associated browsers 182, 190. The HTML document illustrated in FIG. 7B includes JavaScript function definitions and code statements at lines 5-9, contained within the <script> tags at lines 4 and 10. JavaScript statements may also be embedded within HTML statements, as shown by the function calls within the objects defined at lines 13 and 20. In some cases, JavaScript code statements can dynamically alter the display of a web page, for example by displaying text that does not appear within the HTML statements described above.

HTML documents can also contain embedded references to resources outside of the document, such as images, videos, code files, and the like. When a browser encounters such embedded references, it typically retrieves the resource at the specified location and displays it, in the case of a video or image, or processes it for execution, in the case of a code file. The HTML document illustrated in FIG. 7B contains an embedded reference to an image at line 14, corresponding to the advertisement 704 shown in FIG. 7A.

The HTML file may contain harmful code and references to harmful content. For example, line 13 shows source code for transforming the advertisement 704 into an interactive link, which is common and not necessarily harmful. However, line 13 also shows code for invoking a potentially harmful JavaScript function—badFunction ( )—when the advertisement 704 is interacted with. Line 20 includes code for displaying an input control 706, and also includes code for invoking badFunction ( ) when the input control 706 is accessed. The potentially harmful function is JavaScript function that includes a harmful program statement, as shown in line 5. There is a second JavaScript function in the source code listing, beginning at line 7. Unlike the potentially harmful function beginning in line 4, the second function does not contain a harmful program statement. When the NCC POP 142 processes the web page defined by the source code of FIG. 7B, the NCC POP 142 may find a reference to the harmful program statement of line 5 in the harmful content signatures 184, as described below.

Lines 23 and 24 include source code for displaying the link list 708 illustrated in FIG. 7A. Line 24 includes a link with a network address to a web page that is related to the page defined by the source code file of FIG. 7B. Line 23, however, includes a link with a network address to a web page that may be unrelated to the page defined by the source code. While this is a common occurrence on web pages, and is not necessarily harmful or even suspicious, the specific network address shown in line 23 may be present in the blacklist 186, as described below.

Figure 7C:
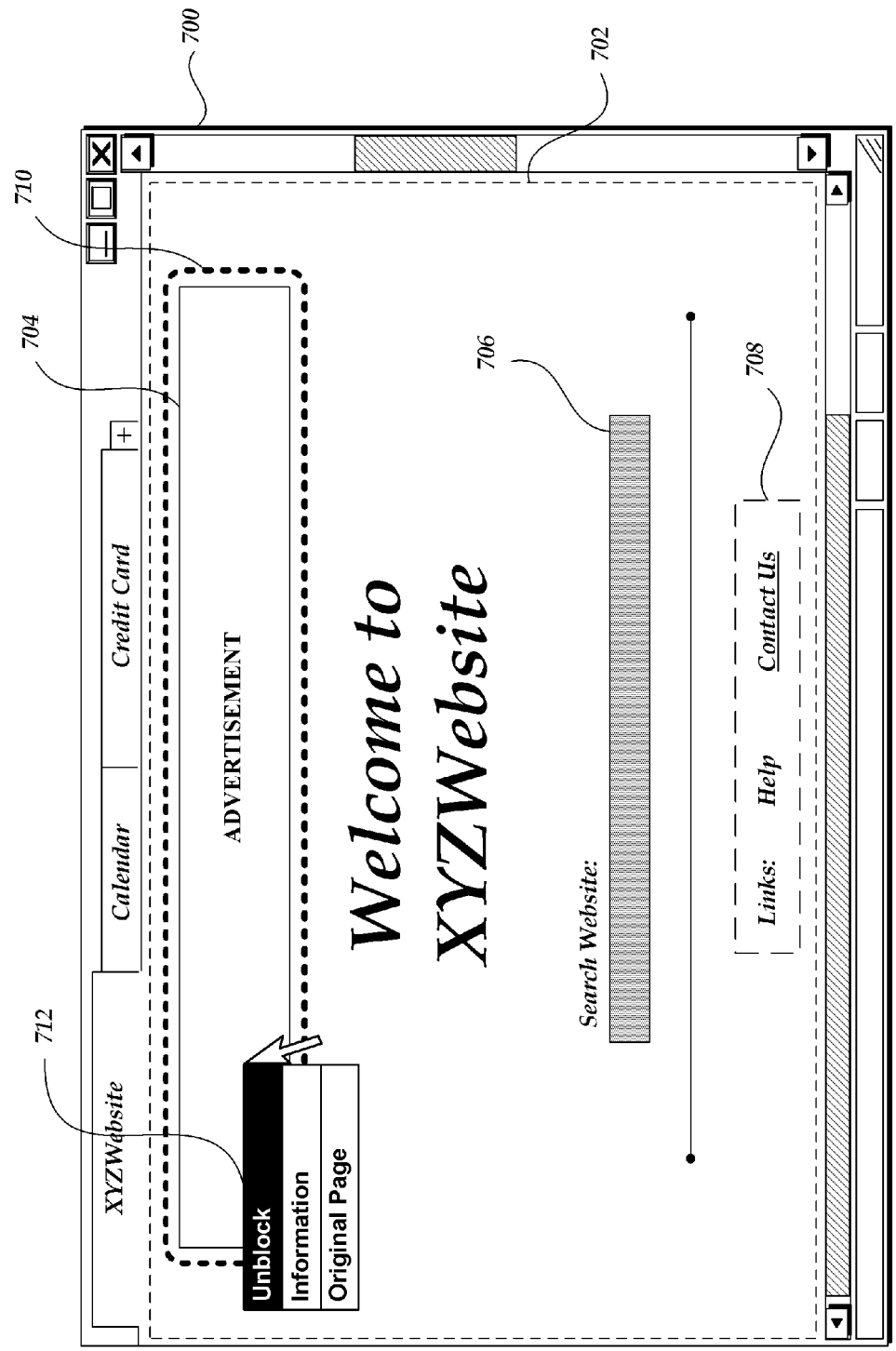
FIG. 7C is a user interface diagram depicting an illustrative browser interface and display of browse session content with harmful content items disabled.

FIG. 7C is a user interface diagram depicting a display of the browse session content illustrated in FIG. 7A after processing by the NCC POP 142. In this example the NCC POP 142 has detected that certain components of the web page may be harmful, and has implemented number of security measures. For example, the advertisement 704, which previously was associated with a harmful JavaScript function, has been converted to a static image and highlighted with a visual indicator 710. While the visual indicator 710 illustrated in FIG. 7C is a dashed circle, other visual indicators are possible. For example, the potentially harmful area may be designated by highlighting or by blocking the display of the content item altogether. Generally, a visual indicator can include any visible marking that alerts a user that a portion of the displayed content was determined to be potentially harmful and has therefore been disabled in some way. The input control 706 that was also associated with the harmful JavaScript function has been disabled as well. In the example illustrated in FIG. 7C, the input control 706 has been converted to a static image. In some embodiments, such input controls 706 can be disabled using other techniques, such as by changing various properties of the control.

The link list 708 has been modified, with the first link—Help—converted into static text. No visual indicator 710 has been placed around the first link, because it has inherently changed in appearance by the conversion into static text. Specifically, it no longer includes the underline which would indicate that it is a link, as is visible under the second link—Contact Us. Similar to the advertisement 704 described above, a visual indicator 710 may be placed around a link or any other control that has been deactivated in some way. In the case of links, this may be useful when a web page has been designed so that live links do not include an underline or other formatting to distinguish them from static text. In some embodiments, links to potentially harmful content may be preserved, and the target of the link can be retrieved in a static format when the user clicks the link. For example, the Help link in the link list 708 can remain in the web page that is transmitted to the user. When a user clicks on the Help link, the target web page can be retrieved by the NCC POP 142, which can strip or otherwise disable the potentially harmful features of the target web page prior to transmitting the web page to the user.

The visual indicator 710 aids in informing the user that a content item or other object has been modified from its original form. The user may be presented with a mechanism for removing the modification and reverting to the original unprocessed form as transmitted from the content source. For example, the NCC POP 142 can add a link or control to the web page, possibly within a popover, for enabling the user to take action. The NCC POP 142 can also be configured to transmit data to the client computing device 102 indicating any content items that have been disabled or removed, and the browser 190 of the client computing device 102 can display a popup menu 712 or other override controls based on the received data. A user can right-click on a disabled content item, causing display of a context-sensitive popup menu 712 that includes a number of different options. For example, the user can unblock the disabled content item, causing the NCC POP 142 to transmit an original version of the item, modify the item settings, etc. In another example, the user can request information about the disabled content item, such as a message indicating why the item was disabled. Additionally, the popup menu 712 may include an option to retrieve the original version of the web page, without any security enhancements from the NCC POP 142. In some embodiments, the override mechanism may be supplied by a standard menu option, toolbar button, touch screen gesture, voice command, keyboard command, or any other appropriate input method. For example, if the client computing device 102 is configured with a touch screen, an override gesture can be supported, such as triple-tapping the web page or a portion thereof to initiate an override.

Various methods of disabling harmful content can be implemented by the NCC POP 142. When the primary content is a web page, in some cases with embedded resources such as images, one technique the NCC POP 142 can use is modification of the web page's HTML source code. For example, the NCC POP 142 can comment out potentially harmful lines, tags, statements, etc. Comments are used to embed annotations into the source code of a computer program. Those annotations are potentially significant to software developers, but are typically ignored by compilers and interpreters, such as the JavaScript engine of a browser. In many programming languages, comments are indicated by the insertion of predetermined characters in front of or surrounding the comment. Placing the predetermined characters in front of or surrounding an otherwise executable code statement has the effect of turning the code statement into a comment that is ignored by the compiler or interpreter.

The NCC POP 142 can also convert potentially harmful objects into static image representations, as described above. The NCC POP 142 can create a static image and save the image in publically accessible location, such as a directory of a web server or application server associated with the NCC POP 142. The NCC POP 142 can then modify the HTML source code to display the newly created static image rather than the potentially harmful object. Alternatively, the NCC POP 142 can modify the HTML source code to remove interactive features or to disable harmful content without substituting a static image for the content.

FIG. 7D is a listing of source code for the content displayed in the browser interface 700 of FIG. 7C. Lines 13 and 15 have been commented out, as indicated by the <!-- and --> tags surrounding the code. The <!-- and --> tags indicate that everything between the tags is an HTML comment, not to be processed and rendered by the browser. Commenting out lines 13 and 15 effectively deletes the code statements on those lines, thereby disabling the interactive features of the advertisement 704. Lines 13 and 15 originally transformed the image of the advertisement 704 into a link to a third party location, as shown in the source code listing of FIG. 7B. Additionally, line 13 invoked a harmful JavaScript function in response to interaction with the advertisement 704. The reference to the image file of the advertisement 704 has also been removed from the HTML code, and the item that is displayed in the location of the original advertisement 704 is a temporary image created by the NCC POP 142, as shown in line 14. When processing the web page, the NCC POP 142 may have determined that the site which was the target of the original link associated with the advertisement 704 was blacklisted, and therefore the NCC POP 142 proceeded to initiate the security measures shown. The NCC POP 142 may also have determined that the advertisement 704 would invoke a harmful function, as determined by comparing to the data store of harmful signatures 184. The NCC POP 142 may have further determined that the image file itself was harmful, for example by exploiting vulnerabilities inherent in certain image formats or in the way browsers may process such images for display. The static image file that the NCC POP 142 creates for display in place of the original advertisement image file can include the same visual aspects of the original advertisement image file. By rendering the image within the browser 182, the NCC POP 142 can create a snapshot of the image, and optionally include a visual indicator, such as the dashed outline 710 displayed in FIG. 7C.

In some embodiments, the NCC POP 142 may delete the potentially harmful source code rather than replacing an item with a static image. For example, this technique may be useful when the potentially harmful object has no corresponding visual representation, such as the JavaScript function badFunction( ). As shown in lines 4-6 of FIG. 7D, function badFunction( ) has been removed from the source code file, and will therefore no longer execute. Similar to replacing a potentially harmful image file with a static image file known to be safe, potentially harmful code statements may be replaced with code statements that are known to be safe and that will preserve the functionality of the web page. Alternatively, the source code could have been commented out, as described above. The link list 708 illustrated in FIG. 7C presents another example of deletion of potentially harmful content. Line 23 of FIG. 7D, which previously included a link with a suspicious target network address, now contains only the word "Help." The HTML tags for turning that text into an interactive link have been removed. In some embodiments, the NCC POP 142 can be configured to modify potentially harmful source code rather than delete it or comment it out.

Figure 7E:
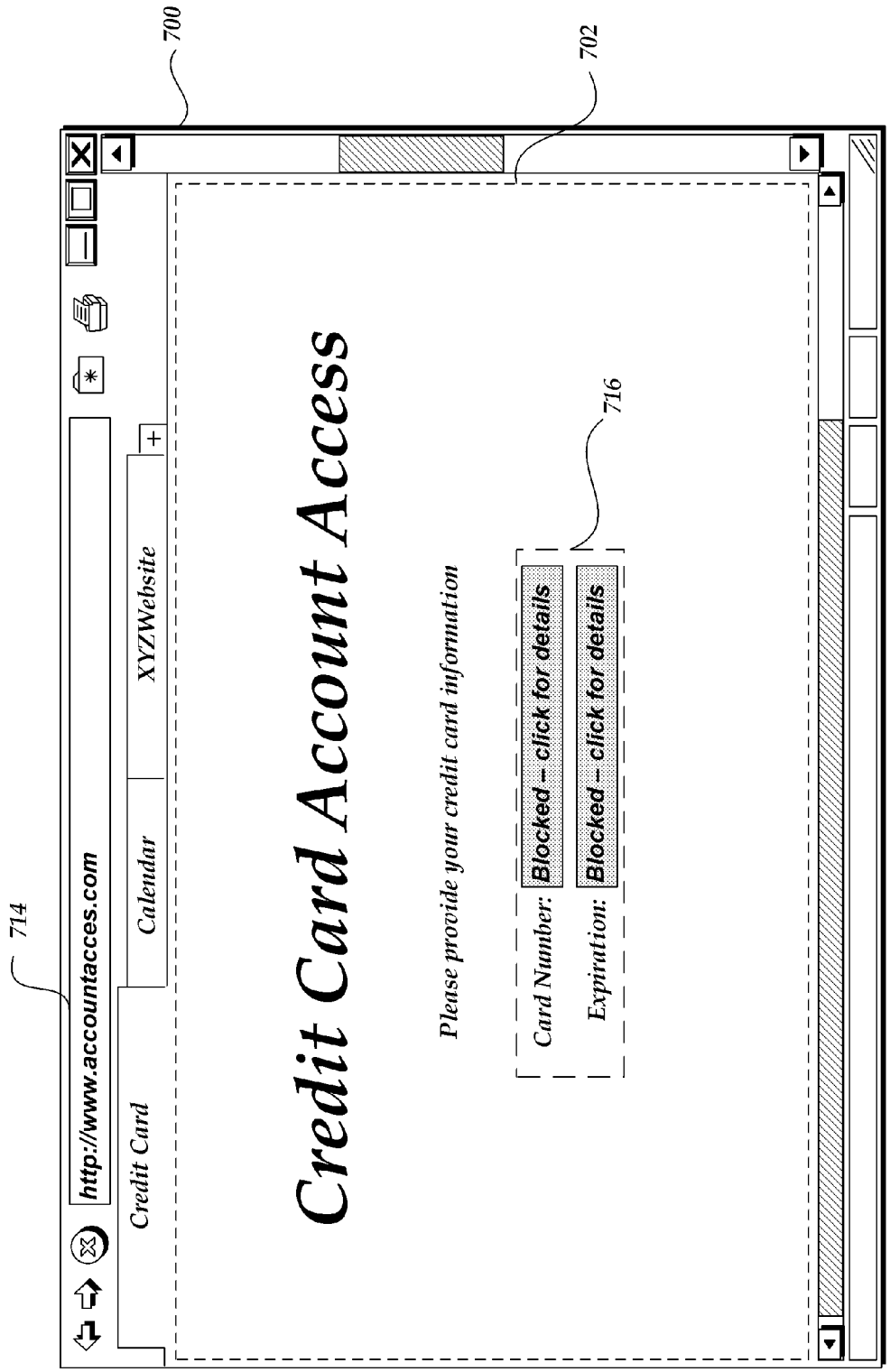
FIG. 7E is a user interface diagram depicting an illustrative browser interface and display of browse session content with harmful content items disabled.

FIG. 7E illustrates a sample browser interface 700 that may be subject to a phishing attack. In general, phishing relies on deception in order to obtain a user's sensitive information. Such sensitive information may include credit card numbers and social security numbers. As shown in FIG. 7E, the browser is displaying a page purporting to be associated with the user's credit card company. The address bar 714 may give an important clue to the phishing attack. In this example, the address bar contains an address for http://www.accountacces.com, which appears to be missing the second "s" at the end. Phishing attacks often attempt to deceive users into thinking that the user is interacting with a known, trusted entity. Therefore, the attack may involve creating web site with visual features similar or identical to the trusted site. In this case, the user's credit card company may reside at the http://www.accountaccess.com address, which includes the second "s" at the end. The NCC POP 142 may recognize the misspelling which closely matches a legitimate credit card web site. Coupled with input fields for the user's credit card information, the NCC POP 142 may determine that this is a phishing attack. Alternatively, the phishing web site may be known and present in the blacklist 186. As described above, the NCC POP 142 can replace potentially harmful content with static images. In this case, the NCC POP 142 determined that has disabled the input controls provided for entry of the user's credit card number and expiration data, shown in the outlined area 716. The NCC POP 142 can, for example, replace the input controls with clickable images that alert the user to the security risk and take the user to a web page for more information.

In some embodiments, the NCC POP 142 can use similar techniques to detect a potential security risk that is not a malicious phishing attack. For example, the NCC POP 142 can recognize when a web page is requesting a credit card number over an insecure connection. The web page illustrated in FIG. 7E has been accessed over a standard HTTP connection, as shown by address bar 714, rather than a secure connection such as HTTPS. In addition, the web page has a field for the user to enter a credit card number, which can be detected by the text prompt next to the field or the name of the input control within the HTML. When the NCC POP 142 detects such a scenario, it can attempt to redirect the request over a secure HTTPS channel or apply security measures similar to those applied for a phishing attack.

FIG. 7F is a listing of source code for the web page illustrated in FIG. 7E, as modified by the NCC POP 142. A potentially harmful JavaScript function on lines 4-6 has been commented out by inserting the designated JavaScript comment characters / / in front of each line. The input controls which would have been present at lines 18 and 20 have been replaced with images hosed by the NCC POP 142, and which are clickable. Upon clicking either of the images, the user's browser 190 will navigate to a web page, also hosted by the NCC POP 142, which contains information about the potential phishing attack. In some embodiments, the images and web page need not be hosted by the NCC POP 142, but can instead be associated with a third party. In some embodiments, a popup message can be displayed to the user in order to give the user information about the risk, rather than redirecting the user to a separate web page.

In some embodiments, an entire web page may be replaced by an image. For example, if a web page is included in a blacklist 186, or if there are multiple potentially harmful portions of the web page, the NCC POP 142 can render the web page in the browser 182 and create a snapshot of the web page. The NCC POP 142 can then transmit the image to the client computing device 102 for display in the browser 190. The NCC POP 142 can retain certain interactive portions of the page, such as links to network addresses which are known to be safe. This can be accomplished by creating a simplified HTML document which contains a reference to the newly created snapshot of the entire web page, along with an image map defining clickable areas. For example, the HTML file can include a <map> tag defining clickable areas of the image which correspond to links which are known to be safe. In response to a user clicking on one of the defined areas, the browser can navigate to the network address corresponding to the link.

Figure 8:
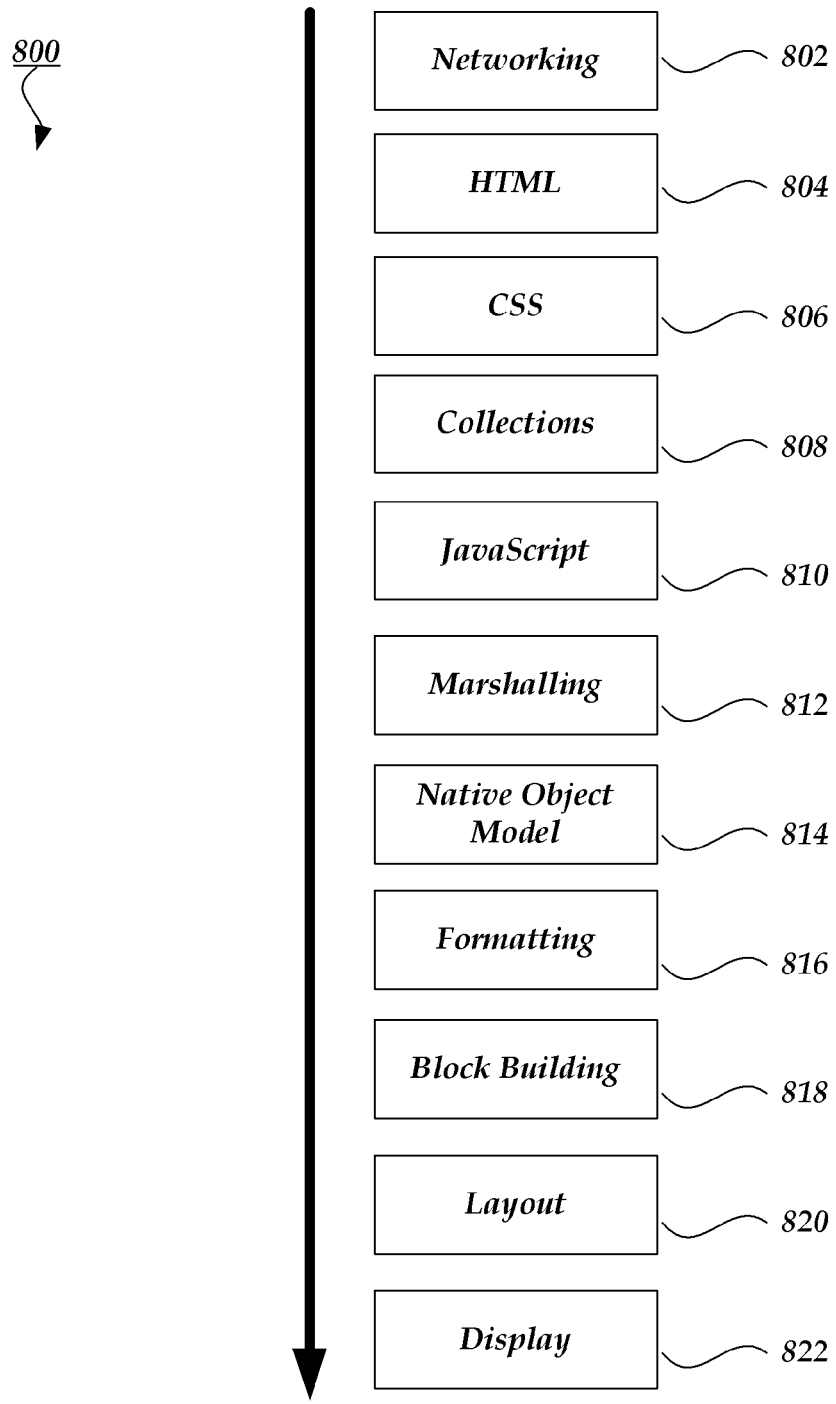
FIG. 8 is a diagram depicting illustrative browser content processing actions as a series of processing subsystems.

FIG. 8 is a diagram depicting illustrative browser content processing actions as a series of processing subsystems 800. In many embodiments, a browser may process sets of content (e.g., network resources such as web pages and associated embedded resources) in a series of processing actions. Illustratively, and as described above with reference to FIGS. 3-5, a remote session browsing configuration may specify a split between processing actions performed at a network computing provider (e.g., an NCC POP) and processing actions performed at a client computing device 102. This split may designate some processing actions to be performed by each of the NCC POP and client computing device 102, or may assign all processing actions to a single device or component. For example, an NCC POP may perform all of these various processing actions at the browse session instance, and send fully processed RDP processing results to the client computing device 102 for bitmap assembly and display. Any number of different remote session browsing configurations may be used by one or more browse sessions instances running at an NCC POP.

One of skill in the relevant art will appreciate that the subsystems shown here are depicted for the purpose of illustration, and are not intended to describe a necessary order or a definitive list of browser subsystems. Various browser software components may implement additional or fewer browser subsystems than are shown here, and may order the subsystems or corresponding processing actions in any number of different ways. Although the processing subsystems 800 depicted here for purposes of illustration are directed at the processing of Web pages or other Web content, one of skill in the relevant art will appreciate that the processing of other file types or network resources may be broken up in a similar manner. For example, one of skill in the relevant art will appreciate that a similar schema may be developed for the processing of images, video, audio, database information, 3d design data, or any other file format or type of data known in the art. Similar schema may also be developed for any number of device operating system or software framework processing operations, such as scheduling, memory or file management, system resource management, process or service execution or management, etc. Further, although the HTML protocol and RDP remote session communication protocols are discussed herein for the purposes of example, one of skill in the relevant art will appreciate that a remote session browsing configuration may implement any number of remote communication protocols for any number of specified processing actions, and that a remote session browsing configuration may be formulated to perform any fraction or combination of the actions identified below at any combination of the client computing device 102 and network computing provider 107.

Illustratively, the first processing subsystem involved in the processing and display of network content is the networking subsystem 802. Illustratively, the networking subsystem 802 may be responsible for all communication between the browser and content provider, including local caching of Web content. The networking subsystem is generally limited by the performance of the user's network. A remote session browsing configuration that splits processing actions at the networking subsystem 802 might include a remote session browsing configuration utilizing an HTML remote session communication protocol, where one or more caching or resource retrieval actions were performed at the NCC POP, but parsing and processing of the content was performed at the client computing device.

As network resources such as HTML documents are downloaded from the server they may be passed to an HTML subsystem 804 which parses the document, initiates additional downloads in the networking subsystem, and creates a structural representation of the document. Modern browsers may also contain related subsystems which are used for XHTML, XML and SVG documents. A remote session browsing configuration that splits processing actions at the HTML subsystem 804 might include a remote session browsing configuration utilizing an HTML remote session communication protocol, where an initial HTML page is processed at the NCC POP in order to extract embedded resource identifiers, but additional parsing and processing of the content is performed at the client computing device. In another embodiment, a remote session browsing configuration that splits processing actions at the HTML subsystem 804 might perform initial processing to create the structural representation of the HTML document, and provides a processing result including the structural representation and associated embedded resources to the client computing device for processing.

When CSS is encountered, whether inside an HTML document or an embedded CSS document, it may be passed to a CSS subsystem 806 to parse the style information and create a structural representation that can be referenced later. Illustratively, a remote session browsing configuration that splits processing actions at a CSS subsystem 806 may construct a processing result including the CSS structural representation and HTML structural representation, and provide the processing result and associated embedded resources to the client computing device for processing.

HTML documents often contain metadata, for example the information described in a document header or the attributes applied to an element. The collections subsystem 808 may be responsible for storing and accessing this metadata. A remote session browsing configuration that splits processing actions at a collections subsystem 808 may construct a processing result including processed metadata along with any other structural representations discussed above, and provide the processing result and associated embedded resources to the client computing device for processing.

When Javascript is encountered, it may be passed directly to a JavaScript subsystem 810 responsible for executing the script. The Javascript subsystem 810 has been examined fully over the years, and may be one of the most well known browser subsystems in the art. A remote session browsing configuration that splits processing actions at a Javascript subsystem 810 may construct a processing result including an internal representation of one or more Javascript scripts, including, but not limited to state data or a representation of the script in a native or intermediate form, as well as any other processed structures or data discussed above, and provide the processing result and associated embedded resources to the client computing device for processing.

Because many JavaScript engines are not directly integrated into the browser, there may be a communication layer including the marshalling subsystem 812 between the browser and the script engine. Passing information through this communication layer may generally be referred to as marshaling. A remote session browsing configuration that splits processing actions at a marshalling subsystem 812 may construct a processing result including marshalling data as well as any other processed structures, scripts, or data discussed above, and provide the processing result and associated embedded resources to the client computing device for processing.

In some embodiments, JavaScript interacts with an underlying network resource such as a Web document through the Document Object Model APIs. These APIs may be provided through a native object model subsystem 814 that knows how to access and manipulate the document and is the primary interaction point between the script engine and the browser. Illustratively, a remote session browsing configuration that splits processing actions at a native object model subsystem 814 may construct a processing result including native object model state data or API calls as well as any other processed structures, scripts, or data discussed above, and provide the processing result and any other associated embedded resources to the client computing device for processing.

Once the document is constructed, the browser may needs to apply style information before it can be displayed to the user. The formatting subsystem 816 takes the HTML document and applies styles. Illustratively, a remote session browsing configuration that splits processing actions at a formatting subsystem 816 may construct a processing result including an HTML representation with applied styles, as well as any other processed state data, API calls, structures, scripts, or data discussed above, and provide the processing result and any other associated embedded resources to the client computing device for processing.

In one embodiment, CSS is a block based layout system. After the document is styled, the next step, at a block building subsystem 818, may be to construct rectangular blocks that will be displayed to the user. This process may determine things like the size of the blocks and may be tightly integrated with the next stage, layout. A remote session browsing configuration that splits processing actions at a block building subsystem 818 may construct a processing result including block information, as well as any other processed state data, API calls, structures, scripts, or data discussed above, and provide the processing result and any other associated embedded resources to the client computing device for processing.

Subsequent to the browser styling the content and constructing the blocks, it may go through the process of laying out the content. The layout subsystem 820 is responsible for this algorithmically complex process. Illustratively, a remote session browsing configuration that splits processing actions at a layout subsystem 820 may process the various state data, API calls, structures, scripts, or data discussed above to construct a processing result including layout information for the client computing device. Illustratively, an NCC POP may make use of various data or settings associated with the client computing device or browser (e.g., as provided in the initial browse session request) in order to generate a suitable layout for the client computing device. For example, a mobile device may provide a screen resolution and a display mode to the NCC POP. The NCC POP may base layout calculations on this screen resolution and display mode in order to generate a processing result corresponding to a content representation suitable for a browser running on the mobile device. Illustratively, in various embodiments, any other subsystem implemented by the NCC POP may make use of data associated with the client computing device or browser in generating a processing result for the client.

The final stage of the process may occur inside the display subsystem 822 where the final content is displayed to the user. This process is often referred to as drawing. A remote session browsing configuration that splits processing actions at the networking subsystem 802 might include a remote session browsing configuration utilizing an RDP remote session communication protocol, where nearly all processing is performed at the NCC POP, and a processing result including bitmap data and low level interface data are passed to the client computing device for display.

Figure 9:
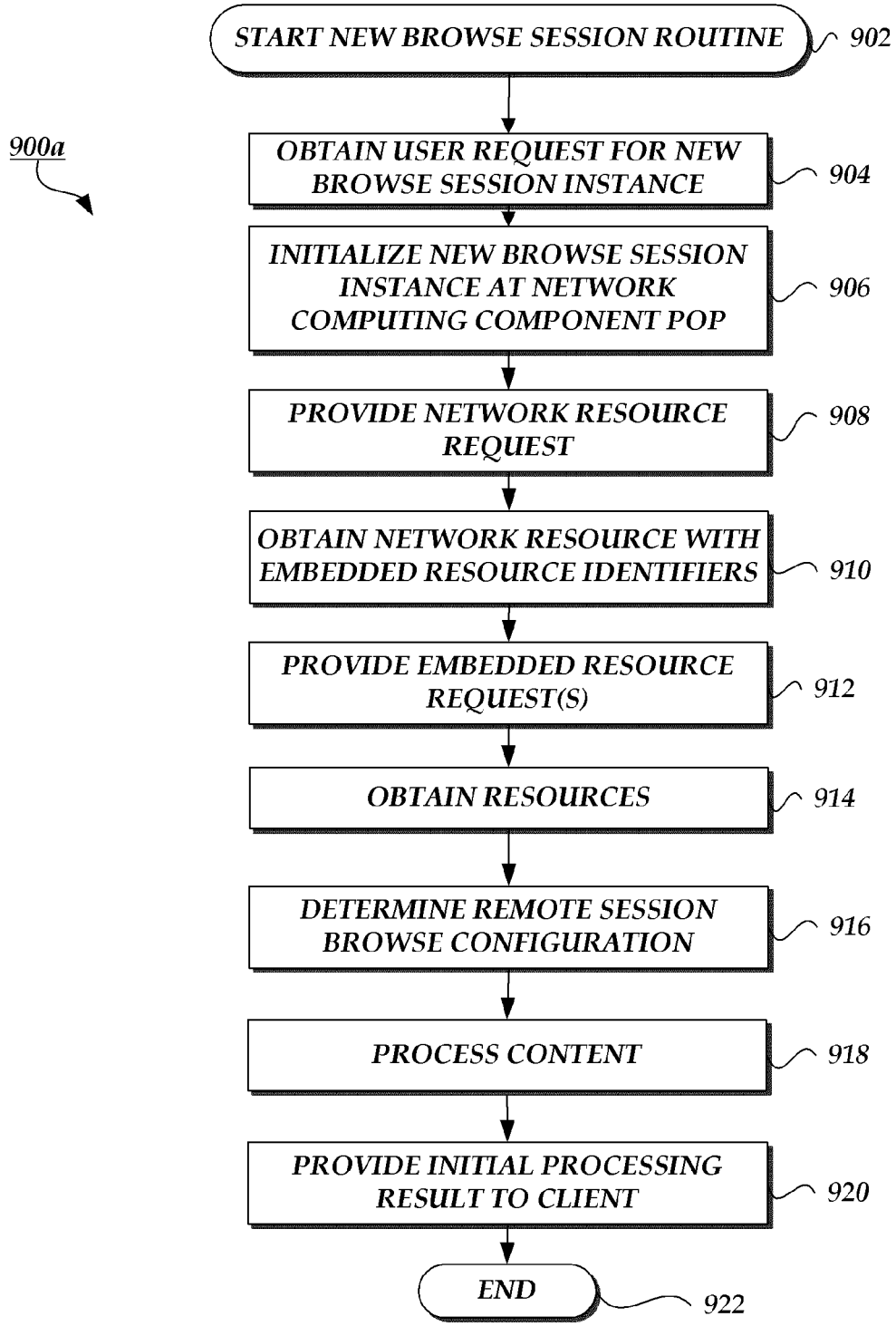
FIG. 9 is a flow diagram illustrative of a new browse session routine implemented by network computing provider.

FIG. 9 is a flow diagram illustrative of a new browse session routine 900 implemented by network computing provider 107 of FIG. 1A. New browse session routine 900 begins at block 902. At block 904, the network computing provider 107 receives a new browse session request from client computing device 102. As previously described, the client computing device 102 may load a browser for viewing network content in response to an event or user request. Subsequent to the browser being loaded, the browser may be implemented request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. This browse session request may include one or more addresses or references to various network resources or other content requested by the client computing device 102. In an illustrative embodiment, the browse session request is transmitted in accordance with an API.

At block 906 the network computing provider 107 may select an associated NCC POP to instantiate a new browse session based on the browse session request. As discussed above with reference to FIG. 1A, a network computing provider 107 may include any number of NCC POPs distributed across any number of physical or logical locations. A network computing provider 107 may select a NCC POP to service a browse session request based on any number of factors, including, but not limited to available NCC POP resources (e.g., available memory, processor load, network load, etc.), a financial cost of servicing the browse session request at the NCC POP, the NCC POP location respective to a client computing device 102, content provider 104, or CDN POP 116, a NCC POP cache status (e.g., whether a requested resource is already stored in an NCC POP cache), etc.

In one embodiment, the network computing provider 107 may select a number of NCC POPs to service a browse session request. For example, the network computing provider 107 may select two NCC POPs with different logical locations in the network. Each NCC POP may independently request and process network content on the behalf of the client computing device 102, and the client computing device 102 may accept data from the first NCC POP to return a processing result. Subsequent to being selected by the network computing provider 107, NCC POP 142 may obtain the browse session request. In one embodiment, NCC POP 142 may have the browse session request forwarded to it by a component of network computing provider 107. In another embodiment, NCC POP 142 or client computing device 102 may receive connection information allowing the establishment of direct communication between NCC POP 142 and client computing device 102. Illustratively, NCC POP 142 may be provided with the browse session request originally provided to network computing provider 107, may be provided with a subset of information (e.g., just a network address of requested content), or may be provided additional information not included in the original browse session request.

Subsequent to the NCC POP 142 being selected, the network computing provider 107 may cause the NCC POP 142 to instantiate a new browse session. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session. Illustratively, one or more characteristics of the new browse session instance and/or browser instance may be based on client computing device 102 information included in the browse session request. For example, the browse session request may include a device type or browser type, a device screen resolution, a browser display area, or other information defining the display preferences or capabilities of the client computing device 102 or browser. The NCC POP 142 may accordingly instantiate a virtual machine instance and/or a browser instance with the same or similar capabilities as the client computing device 102. Illustratively, maintaining a virtual machine instance and/or browser with the same or similar capabilities as the client computing device 102 may allow the NCC POP 142 to process network content according to the appropriate dimensions and layout for display on the particular client computing device 102.

In some embodiments, the NCC POP 142 may utilize an existing virtual machine instance and/or browser instance in addition to, or as an alternative to, instating a new browse session. For example, subsequent to the NCC POP 142 being selected, the network computing provider 107 may cause the NCC POP 142 to associate an existing browser instance and/or virtual machine instance, such as one or more instances previously instantiated at the NCC POP 142, with the new browse session request. Illustratively, an existing browser session and/or virtual machine instance may correspond to another browse session, remote application session, or other remote process associated with the user or client computing device 102, or may be a previously instantiated software instance from an unrelated browse session or remote process. In other embodiments, the NCC POP 142 may instantiate a new browser or other application process in an existing virtual machine instance, or may combine the utilization of previously instantiated and newly instantiated software processes in any number of other ways. In still further embodiments, the network computing provider or NCC POP 142 may instantiate any number of new virtual machine instances and/or browser instances (or make use of existing instantiated instances) based on a single browse session request.

At block 908 the network computing provider 107 may provide a request for one or more network resources to a content provider or CDN service provider based on a network address included in the browse session request. In various embodiments, one or more network resources may be additionally or alternately retrieved from a cache local to the NCC POP 142 or otherwise associated with the network computing provider 107. One of skill in the art will appreciate that, in the case of other embodiments, the link or network address may correspond to a document or file stored in a digital file locker or other network storage location or at a cache component associated with the network computing provider 107 or client computing device 102. In some embodiments, the new session request may include a document or file in addition to or as an alternative to a network address. At block 910, the network computing provider 107 obtains the one or more network resources. Subsequent to obtaining the requested network resource, the NCC POP 142 may process the network resource to extract embedded resource identifiers.

At block 912, the network computing provider 107 may provide resource requests to one or more sources of content such as content providers, CDN service providers, and caches. The resource requests may correspond to embedded resources based on the one or more embedded resource identifiers extracted from the one or more network resource as described in block 910 above. At block 914, the network computing provider 107 may obtain these embedded resources from any number of different sources, sequentially or in parallel.

At block 916, the network computing provider 107 may process the one or more network resources and associated embedded resources to determine a remote session browsing configuration for the processing and communication of content to the client computing device 102. A remote session browsing configuration may include any proprietary or public remote protocol allowing exchange of data and user interactions or requests between a client and a remote server. The remote session browsing configuration may illustratively include both a remote session communication protocol and a processing schema for providing processed (or unprocessed) content to a client computing device for display in the content display area of a browser.

Illustratively, a remote session browsing configuration may define or specify a remote session communication protocol, including, but not limited to, a network protocol, signaling model, transport mechanism, or encapsulation format for the exchange of state data, user interactions, and other data and content between the network computing provider and the client computing device. Examples of remote session communication protocols known in the art include Remote Desktop Protocol (RDP), X-Windows protocol, Virtual Network Computing (VNC) protocol, Remote Frame Buffer protocol, HTML, etc. For example, RDP illustratively specifies a number of processing mechanisms for encoding client input (e.g., mouse movement, keyboard input, etc.) into protocol data units for provision to a remote computing device, and corresponding mechanisms for sending bitmap updates and low level interface information back to the client device. As another example, the HTML protocol illustratively provides a mechanism for providing files defining interface information and containing resources references from a server to a client, and a corresponding mechanism for a client computing device to provide requests for additional files and resources to the server. In one embodiment, the NCC POP 142 may provide an initial communication to the client computing device 102 after determining the remote session communication protocol. This initial communication may allow the client computing device 102 to prepare to receive communications in the selected remote session communication protocol, and, in the case of pull remote session communication protocols like HTTP, may cause the client computing device to send an initial resource request to the browse session instance running on the NCC POP 142.

Each remote session browsing configuration may additionally define a split of processing actions between the network computing service (e.g., NCC POP 142) and the client computing device (e.g., client computing device 102). In one embodiment, a particular split of processing actions may be based on or mandated by a particular remote session communication protocol. In another embodiment, a remote session communication protocol may allow several different splits of processing actions depending on the implementation or configuration of the protocol. For the purpose of illustration, many pieces of network content (e.g., Web pages, video, Flash documents) may require various processing actions before being displayed on a computing device. A Web page, for example, may be parsed to process various HTML layout information and references to associated resources or embedded content such as CSS style sheets and Javascript, as well as embedded content objects such as images, video, audio, etc. The HTML and each referenced object or piece of code will typically be parsed and processed before a representative object model corresponding to the Web page may be constructed. This object model may then be processed further for layout and display in a content display area of a browser at the client computing device 102. Illustrative browser processing actions are described in greater detail below with reference to FIG. 8. One of skill in the art will appreciate that, in the case of other embodiments or applications, various other processing actions may be required.

A remote session browsing configuration may specify that various of the processing actions required for display of piece of network content be performed at the remote computing device, such as the NCC POP 142, rather than at the client computing device 102. Network content partially (or wholly) processed at the network computing provider may be referred to as a processing result. As discussed below, the split of processing actions may be associated with or linked to the remote session communication protocol used for exchanging data and client input between the NCC POP 142 and client computing device 102.

For example, a remote session communication protocol such as RDP that transmits a processing result including low level interface information and bitmaps to the client computing device 142 for display may be associated with a remote session browsing configuration that specifies performing all, or nearly all, of the necessary content processing actions at the NCC POP 142. While using RDP, the NCC POP 142 may, for example, run a full instance of a browser the NCC POP 142 and transmit a processing result consisting of bitmap updates corresponding to a representation of the displayed content to the client computing device 102. The client computing device 102, in this example, may merely be required to assemble the transmitted bitmap updates for display in the content display area of the browser, and may perform none of the processing of the actual HTML, Javascript, or data objects involved in the display of an illustrative piece of network content. As another example, a remote session browsing configuration utilizing a remote session communication protocol such as HTML may transmit network content in a largely unprocessed form. The client computing device 102 may thus perform all of the processing actions required for display of network content while the NCC POP 142 performs little or no processing.

The NCC POP 142 may base its determination of a remote session browsing configuration on any number of factors, including, but not limited to, one or more characteristics of one or more of the requested resources, content provider 104, or CDN service provider 106, one or more characteristics of the content address or domain, one or more characteristics of the client computing device 102, browser or application, user, one or more characteristics of the NCC POP 142, or one or more characteristics of the network or network connection, etc. Characteristics of requested resources may include, but are not limited to, a data format, a content type, a size, processing requirements, resource latency requirements, a number or type of interactive elements, a security risk, an associated user preference, a network address, a network domain, an associated content provider, etc. Characteristics of a content provider 104, CDN service provider 106, computing device 102, or NCC POP 142 may include, but are not limited to, processing power, memory, storage, network connectivity (e.g., available bandwidth or latency), a physical or logical location, predicted stability or risk of failure, a software or hardware profile, available resources (e.g., available memory or processing, or the number of concurrently open software applications), etc. The NCC POP 142 may further consider perceived security threats or risks associated with a piece of content or domain, preferences of a client computing device or a content provider, computing or network resource costs (e.g., a financial cost of processing or bandwidth, resource usage, etc.), predetermined preferences or selection information, any additional processing overhead required by a particular remote session browsing configuration, a cache status (e.g., whether a particular resources is cached at a NCC POP 142, at the client computing device 102, or at other network storage associated with the network computing provider), a predicted delay or time required to retrieve requested network content, a preferred content provider or agreements with a content provider for a particular remote session browsing configuration or level of service, a remote session browsing configuration being used for another (or the current) browse session by the same user, or any other factor.

In some embodiments, an NCC POP 142 may base a determination of a remote session browsing configuration on past behavior or practice. For example, an NCC POP 142 that has determined a remote browse session configuration for a particular resource in the past may automatically select the same remote browse session configuration when the resource is requested by the same (or potentially a different) user. As another example, a user that has a history of frequently accessing Web sites with extensive processing requirements may automatically be assigned a remote session browsing configuration that performs the majority of processing at the NCC POP 142. In other embodiments, an NCC POP 142 may base a determination of a remote browse session configuration on predictions of future behavior. For example, an NCC POP 142 may base its determination of a remote browse session configuration for a particular resource on an analysis of past determinations made for a particular Web site, network domain, or set of related resources. A content provider that historically has provided video-heavy Web pages may be associated with a remote session browsing configuration that emphasizes video performance at the client computing device 102. Illustratively, past historical analysis and future predictions may be considered as one or more of a number of factors on which to base the remote session browsing configuration determination process, or may be definitive in the decision making process. For example, once an NCC POP 142 determines a remote session browsing configuration for a particular content provider, it may skip the remote session browsing configuration determination process for any future resources served from the content provider. Illustratively, the NCC POP 142 may re-determine a remote session browsing configuration to be associated with the content provider after a fixed period of time, or after the NCC POP 142 has identified or determined a change in the content being served by the content provider.

In other embodiments, a network resource, Web site, network domain, content provider, or other network entity may specify or otherwise request the use of a particular remote browse session configuration in a resource tag, metadata, or other communication with an NCC POP 142. The NCC POP 142 may treat the request as definitive, or may consider the request as one of multiple factors to be considered in the decision making process.

For example, a remote session browsing configuration utilizing a remote session communication protocol such as RDP may specify extensive processing to occur at the network computing provider 107 (e.g., at NCC POP 142) rather than at the client computing device 102. The remote session browsing configuration may thus leverage the processing power of the NCC POP 142 to achieve lower latencies and presentation delay when dealing with network content that requires a great deal of pre-processing (e.g., content with a great deal of CSS or Javascript information defining page layout). The NCC POP 142 may therefore select a remote session browsing configuration that performs a substantial amount of processing at the network computing provider 107 and utilizes RDP or a similar remote session communication protocol for communication of processing-intensive content. Conversely, a remote session browsing configuration that utilizes a remote session communication protocol such as HTML may specify extensive processing at the client computing device 102 rather than at the network computing provider 107. The remote session communication protocol may thus achieve smaller delays and smoother presentation when presented with simple network content that requires very little processing or network content that requires rapid change in displayed content after its initial load. For example, a Web page with embedded video may perform better performing the majority of processing locally and utilizing HTML rather than RDP as a remote session communication protocol. A remote session browsing configuration specifying extensive processing at the network computing provider 107 must process the video at the NCC POP 142 and rapidly send screen updates (e.g. by RDP) to the client computing device 102, potentially requiring a great deal of bandwidth and causing choppy playback in the browser, while a remote session browsing configuration specifying local processing may provide raw video information directly to the client computing device 102 for display (e.g. by HTML), allowing for client side caching and a smoother playback of content.

As a further example, the NCC POP 142 in communication with a client computing device 102 with extremely limited processing power may elect to use a remote session browsing configuration that requires very little processing by the client computing device, for example, using RDP to transmit NCC POP 142 processed results. Conversely, an NCC POP 142 providing an extremely interactive Web page may elect to use a remote session browsing configuration that allows the client computing device 102 to handle user interactions locally in order to preserve interface responsiveness, for example, using HTML to transmit substantially unprocessed data. As a still further example, a NCC POP 142 may base the determination of a remote session browse configuration on preferences provided by the client computing device 102. A client computing device 102 may illustratively include preferences for a remote session browse configuration in an initial browse session request, or at any other time. The NCC POP 142 may utilize these preferences as an alternative to, or in addition to any other factor or decision metric. Illustratively, allowing the client computing device 102 to set or influence the selection of a remote session browse configuration allows the NCC POP 142 to take user preferences in account when determining a remote session browse configuration. For example, a user worried about initial page load times may prefer to use a remote session browsing configuration heavy on remote processing and utilizing an RDP remote session communications protocol, while a user wishing to maintain an extremely responsive interface may prefer using a remote session browsing configuration that performs the majority of the processing on the client computing device 102, for example, using an HTML remote session communication protocol.

Illustratively, the NCC POP 142 may base a determination of a remote browsing configuration on any factor or combination of factors. For example, the NCC POP 142 may select a remote session browsing configuration based on a single factor, or may assign weights to one or more factors in making a determination. In some embodiments, the determination process of the NCC POP 142 may change based on one or more factors described above. For example, an NCC POP 142 communicating with a client computing device 102 over a network with a surplus of unused bandwidth may give a low weight to factors such as the network requirements of a remote browse session, and may give a higher weight to factors such as the latency of page interactions, while an NCC POP 142 communicating with a client computing device 102 over a limited bandwidth network may give a higher weight to factors dealing with the efficiency of the remote session browse protocol over a network.

In one embodiment, the NCC POP 142 may select a single remote session browsing configuration for a set of network content. For example, the NCC POP 142 may select a single remote session browsing configuration for a requested network resource such as a Web page. The NCC POP 142 may thus process the Web page together with all embedded content based on the selected remote browsing session protocol, and utilize the remote browsing session protocol to exchange user interaction data and updated browse session data for all embedded content associated with the Web page. In another embodiment, the NCC POP 142 may select different remote session browsing configurations for one or more resources in a set of network content. For example, a network resource such as a Web page may reference processing intensive embedded Javascript or CSS resources, as well as embedded video resources. The NCC POP 142 may select a first remote session browsing configuration for the Web page and all embedded resources excluding the embedded video resource, and a second remote session browsing configuration for the embedded video resource. Illustratively, this may result in the NCC POP 142 utilizing RDP to send a processing result to the client computing device 102 for display of the Web page and associated embedded resources, while utilizing HTTP to send the embedded video as a separate, unprocessed file. In one embodiment, the client computing device 102 may perform the minimal processing required to display the RDP processing result corresponding to the Web page and embedded resources, and may also perform additional processing necessary to display the embedded video, for example, overlaying the video on top of the displayed RDP representation of the Web page. Any number of remote session browsing configurations may be selected to correspond to any number of resources or objects included in a set of network content, regardless of whether resources or objects are obtained from a content provider 104 or CDN service provider 106 in one or more logical files or data structures.

Although the selection of a remote session browsing configuration is illustratively depicted herein as occurring after all network resources and associated embedded content have been obtained by the NCC POP 142, one skilled in the relevant art will appreciate that the selection of a remote session browsing configuration may be performed at any time. For example, the NCC POP 142 may select a remote session browsing configuration after receiving a new browse session request or related information from the client computing device, may select a remote session browsing configuration after obtaining a network resource, but before obtaining any associated embedded resources, or at any other time. In some embodiments, the NCC POP 142 may switch to a new remote session browsing configuration at some time subsequent to the client computing device 102 obtaining an initial processing result. Illustratively, the NCC POP 142 selecting a new remote session browsing configuration may occur automatically after a certain time period or event or in response to a change in network conditions, NCC POP 142 or client computing device 102 load or computing resources, or any other factor described above as potentially influencing the choice of remote session browsing configuration. Illustratively, an NCC POP 142 dealing with other types or formats of information may select a remote session protocol based on any number of similar factors. For example, one of skill in the relevant art will appreciate that a similar schema may be developed for the processing of images, video, audio, database information, 3d design data, or any other file format or type of data known in the art.

The client computing device 102 may, in various embodiments, further instantiate a parallel browsing process sequentially or simultaneously with the request for a remote browse session. In one embodiment, a client computing device 102 may instantiate a traditional local browse session as known in the art (e.g., providing content requests from the browser and processing obtained resources locally) in addition to one or more remote browse instance executing at an NCC POP 142.

In another embodiment, a client computing device 102 may be provided with unprocessed network resources by the NCC POP 142. Illustratively, the network resources may have been retrieved from one or more content providers, CDNs, or cache components by the NCC POP 142. The resources may be provided to the client computing device 102 to process locally in parallel with the remote browse instance executing at the NCC POP 142. In still further embodiments, the network computing provider or NCC POP 142 may instantiate any number of new virtual machine instances and/or browser instances (or make use of existing instantiated instances) to process resources and/or send processing results to the client computing device 102 in parallel. Illustratively, the local browse session at the client computing device 102 and the remote browse session instance at the NCC POP 142 may execute in parallel.

In one embodiment, a local browse session executing at the client computing device 102 may obtain unprocessed content (e.g., html Web pages, embedded content, and other network resources) from the NCC POP 142 responsive to a browse session request. Illustratively, the content may have been retrieved by the NCC POP 142 from a content provider, CDN, or cache in response to the browse session request. The unprocessed content provided by the NCC POP 142 may include all the content associated with the browse session request or may supplement content existing in a cache of the client computing device, retrieved from a content provider or CDN, or obtained from some other source. In one embodiment, a client computing device 102 may obtain all requested content from a local cache, and may not obtain any unprocessed resources or content from the NCC POP 142. Subsequent to obtaining the unprocessed content, client computing device 102 may process the requested content in parallel with a remote browse session executing at the NCC POP 142. For example, as the local browse session executing at the client computing device 102 is processing the requested content, a remote browse session executing at the NCC POP 142 may be processing the same content at substantially the same time. Once the NCC POP 142 has performed a set of processing actions on the content to generate a processing result (e.g., as specified by a determined remote session browsing configuration), the NCC POP 142 may provide the processing result to the client computing device 102.

For the purpose of illustration, a client computing device 102 may require a longer load time to obtain and process requested network resources than a browse session instance running at the NCC POP 142. For example, the NCC POP 142 may obtain and process content quickly due to its position on the network and the relative processing power of the local client computing device as compared to the NCC POP 142. Even if the NCC POP 142 provides the client computing device 102 with all requested network content, the client computing device 102 may still obtain a processing result from NCC POP 142 before the local browse session has fully completed processing the requested resources. The client computing device 102 may complete any further processing steps and display the obtained processing result before completing local processing and display of the content. Illustratively, this may allow the client computing device 102 to take advantage of an NCC POP 142's quicker content load time relative to a traditional local browse session. Prior to the local browse session completing the processing all requested resources, the browser may process any user interactions locally and/or remotely as described in FIGS. 5 and 11 below.

Once the local browse session has fully obtained and processed resources corresponding to the requested content, the computing device 102 may determine whether to continue to display results obtained from the NCC POP 142 (and process user interactions at the NCC POP 142) using the determined remote session browsing configuration or switch to processing user interactions locally. Switching to process user interactions locally may include replacing a displayed representation of the requested resources based on a processing result obtained from the NCC POP 142 with a local display of the requested resources. For example, a browser may display a representation of a Web page corresponding to a processing result from the NCC POP 142 (e.g., RDP display information representing the rendered page) until the browser is finished processing and rendering the Web page locally. The browser may then replace the representation from the NCC POP 142 with the locally rendered representation of the Web page. Illustratively, replacing one representation with another representation may be transparent to the user. For example, the local and NCC POP 142 representations of the Web page may be identical or substantially identical. In one embodiment, when the NCC POP 142 representation of the web page is displayed, the browser may send various user interactions with the displayed page to the NCC POP 142 for processing. When the locally rendered version of the Web page is displayed, user interactions may be processed locally at the browser. Illustratively, the determination of which representation of the requested resources to display (e.g., local or from the NCC POP 142) may be based on any of the same factors described with reference to determining a remote session browse protocol in above.

In one embodiment, the client computing device 102 may switch to processing user interactions locally as soon as local resources are fully loaded. Illustratively, the remote browse session instance running at the NCC POP 142 may be terminated after switching to local processing, or the remote browse session instance may be maintained as a backup in case of unresponsiveness or a failure with regards to the local browse session. For example, the client computing device 102 may process user interactions locally, as well as sending remote user interaction data to the NCC POP 142 in accordance with the selected remote session browsing configuration. The remote user interaction data may be used by the NCC POP 142 to keep the remote browse session instance fully in parallel with the local browse process being executed by the browser at the client computing device 102. As long as the local browse session continues to handle user interactions, the NCC POP 142 may either refrain from sending updated processing results, or may send updated processing results ignored by the client computing device 102. If a problem develops with the local browse session at the client computing device 102, updated processing results may be provided to the client computing device 102 from the NCC POP 142 for processing and display in lieu of the local browse session. Illustratively, this switch from the local browse session to remote processing may be transparent to the user. In some embodiments, the client computing device 102 may switch from a local browse session to a remote browse session instance based on factors other than unresponsiveness or failure at the local browser. For example, the client computing device 102 or network computing component 107 may select between a remote and local browse session based on any of the factors enumerated with regards to determining a remote session browse protocol above In another embodiment, the client computing device 102 may continue to process and display updated processing results from the NCC POP 142 even after the local browse session has fully loaded the requested content. The client computing device 102 may terminate the local browse session or may run the local browse session in parallel as a backup process in the converse of the example provided above. It should be appreciated that although the local browse session is described here for the purpose of illustration as being slower to load than the remote browse session instance, in some embodiments the local browse session may load the content faster than the remote browsing session, in which case the browser may process user interactions locally until the remote browse process has fully loaded the requested content. In some embodiments, the client computing device 102 may display and process user interactions through whichever browse session, local or remote, loads the requested content first.

In various other embodiments, the network computing provider 107 may instantiate multiple remote browse session instances to run in parallel in addition to or as an alternative to instantiating a local browse session. Illustratively, these parallel browse session instances may utilize any of the same or different remote session browse protocols, and may act as backups in the manner described above with regard to a local browse session, or may be used and switched between as alternatives in order to maximize browser performance at the client computing device 102. For example, in response to one or more browse session requests, the network computing provider 107 may instantiate a browse session instance running on a first NCC POP and utilizing an RDP protocol as well as browse session instance running on a second NCC POP utilizing an X-Windows protocol. The client computing device 102 or the network computing provider 107 may determine which browse session instance and protocol should be used based on performance or resource usage considerations as described with regards to determining a remote session browse protocol above.

With continued reference to FIG. 9, at block 918, the network computing provider 107 may process the obtained content, including the one or more requested network resources and embedded network resources, according to the determined remote session browsing configuration to generate an initial processing result. At block 920, the network computing provider 107 may provide the initial processing result to the client for further processing and display in the content display area of the browser. For the purposes of further example, an illustrative client new browse session interaction routine 1000 implemented by client computing device 102 is described below with reference to FIG. 10. At block 922, the start new browse session routine 900 ends.

Figure 10:
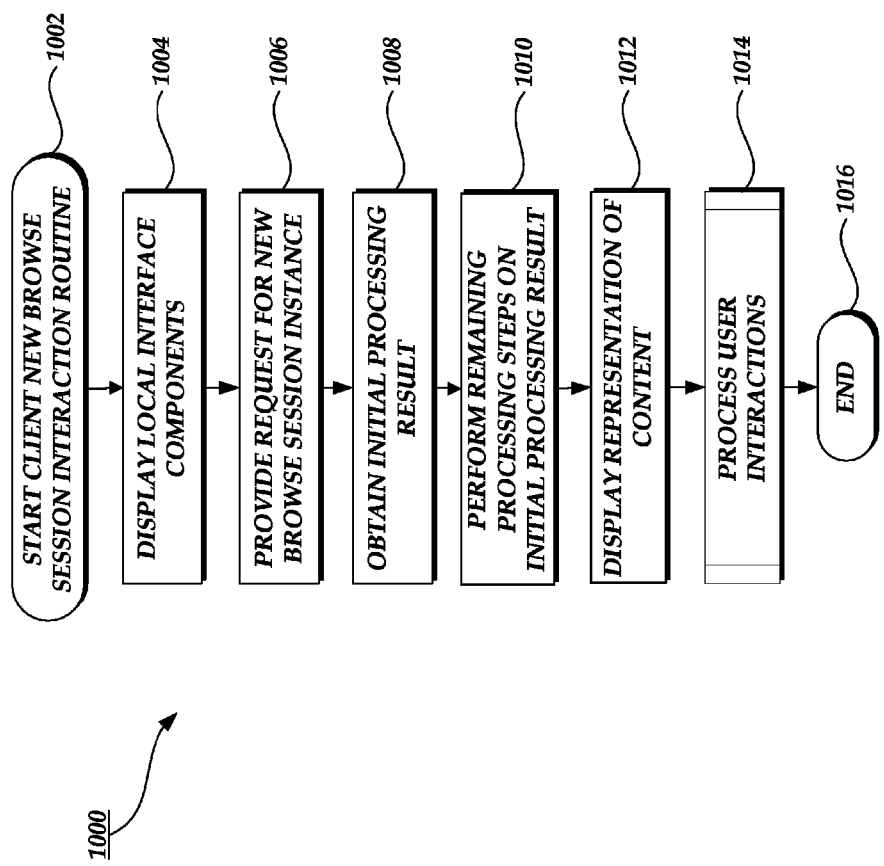
FIG. 10 is a flow diagram illustrative of a client new browse session interaction routine implemented by a client computing device.

FIG. 10 is a flow diagram illustrative of a client new browse session interaction routine 1000 implemented by client computing device 102. New browse session interaction routine 1000 begins at block 1002 in response to an event or user request causing the client computing device 102 to load a browser for viewing network content. At block 1004, the client computing device loads locally managed components of the browser, including all local interface components. As described above with reference to FIGS. 5 and 7, local interface components may include toolbars, menus, buttons, or other user interface controls managed and controlled by the software browser application or any other process executing or implemented locally at the client computing device. At block 1006, the client computing device 102 provides a request for a new browse session instance to the network computing provider 107. From the perspective of the user of the client computing device, the request for the new browse session corresponds to the intended request to transmit the request to one or more corresponding content providers 104. In other embodiment, the new session request may correspond to a request to load a file or other document (e.g., a request to load an image in a photo-editing application, etc.).

Illustratively, the request may be generated automatically as a result of the browser loading (e.g., a request for a default or "home" page), or may be generated as a result of a user following a link or entering a network address into an address bar. As illustrated with respect to FIG. 2, the browse session request is transmitted first to a network computing provider 107. In an illustrative embodiment, the network computing provider 107 utilizes a registration API to accept browse session requests from the client computing device 102.

A browse session request may include any number of pieces of data or information including, but not limited to, information associated with a user, information associated with the client computing device 102 or software on the client computing device (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. For example, a browse session request from the client computing device 102 may include information identifying a particular client computing device hardware specification or a hardware performance level, latency and bandwidth data associated with recent content requests, a desired security level for processing different types of content, a predetermined preference list of remote session browse protocols, and one or more network addresses corresponding to requested network resources, among others. In another example, the browse session request can include information identifying a client computing device 102 screen resolution, aspect ratio, or browser display area in the browse session request may allow the network computing provider 107 to customize the processing of network content for display on the client computing device. As previously described, the browse session request can include network address information corresponding to a requested network resource, which may be in any form including, but not limited to, an Internet Protocol ("IP") address, a URL, a Media Access Control ("MAC") address, etc. In one embodiment, the request for a new browse session instance may correspond to the network computing provider receiving a request for a new browse session instance at block 904 of FIG. 9 above.

At block 1008, the client computing device 102 obtains an initial processing result from the network computing provider 107. Illustratively, the format and data included in the initial processing result may vary based on the remote session browsing configuration selected by the network computing provider 107. In one embodiment, the initial processing result may include or be preceded by data informing the client computing device 102 of the choice of remote session browsing configuration and/or establishing a connection over the remote session communication protocol corresponding to the selected remote session browsing configuration. As discussed above with reference to FIGS. 8 and 9, the obtained initial processing result may include requested content with one or more processing actions performed by the network computing provider 107. Subsequent to obtaining the initial processing result, the client computing device 102 may perform any remaining processing actions on the initial processing result at block 1010.

At block 1012, the client computing device 102 displays the content corresponding to the processed initial processing result. For example, the client computing device 102 may display the processed client in the content display area 702 of a browser 700 as described in FIG. 7A above. In one embodi-
ment, the processing result may only include display data corresponding to content displayed by a browser, and may not include display data corresponding to, for example, the interface controls of a browser instance at the NCC POP 142, the desktop of a virtual machine instance corresponding to the browse session, or any other user interface of the NCC POP 142. For example, the NCC POP 142 may process a Web page and associated content for display via RDP in a browser instance running in a virtual machine instance at the NCC POP 142. The browser instance may have one or more interface elements such as toolbars, menus, scroll bars, etc., in addition to the displayed Web page. The NCC POP 142 may send an RDP processing result corresponding to the displayed Web page only, without any of the interface elements associated with the browser. Illustratively, including an RDP processing result corresponding to the displayed Web page only may allow the browser at the client computing instance 102 to display the Web page by assembling the RDP processing result in the content display area of the browser without any further processing. In another embodiment, the RDP processing result may include a full virtual machine desktop and browser window corresponding to the full interface displayed at the NCC POP 142 browse session instance. The client computing device may automatically identify the area of the RDP processing result corresponding to the requested content, and may display only this area in the content display area of the browser.

At block 1014, the client computing device 102 processes local and remote user interactions. An illustrative routine for processing user interactions is provided below with reference to FIG. 11. At block 1016 the routine ends. Illustratively, a browse session instance instantiated by the network computing content provider 107 may terminate when a browser window or content display area is closed, may terminate when a remote session browse protocol is replaced by a parallel process at the client computing device 102, or may terminate in accordance with a timer or other event. Illustratively, if a browse session has terminated automatically due to a time-out but has associated content still displayed in a browser at the client computing device 102, later attempts by the user to interact with the content may result in a new browse session request being provided to the network computing service provider 107 to start a new browse session according to the last state of the terminated session. Illustratively, terminating a remote browse session after a time-out may allow the network computing storage provider 107 to save computing resources at the NCC POP. In one embodiment, this process may be transparent to the user at client computing device 102, even though the remote browse session has been terminated during the intervening period.

Figure 11:
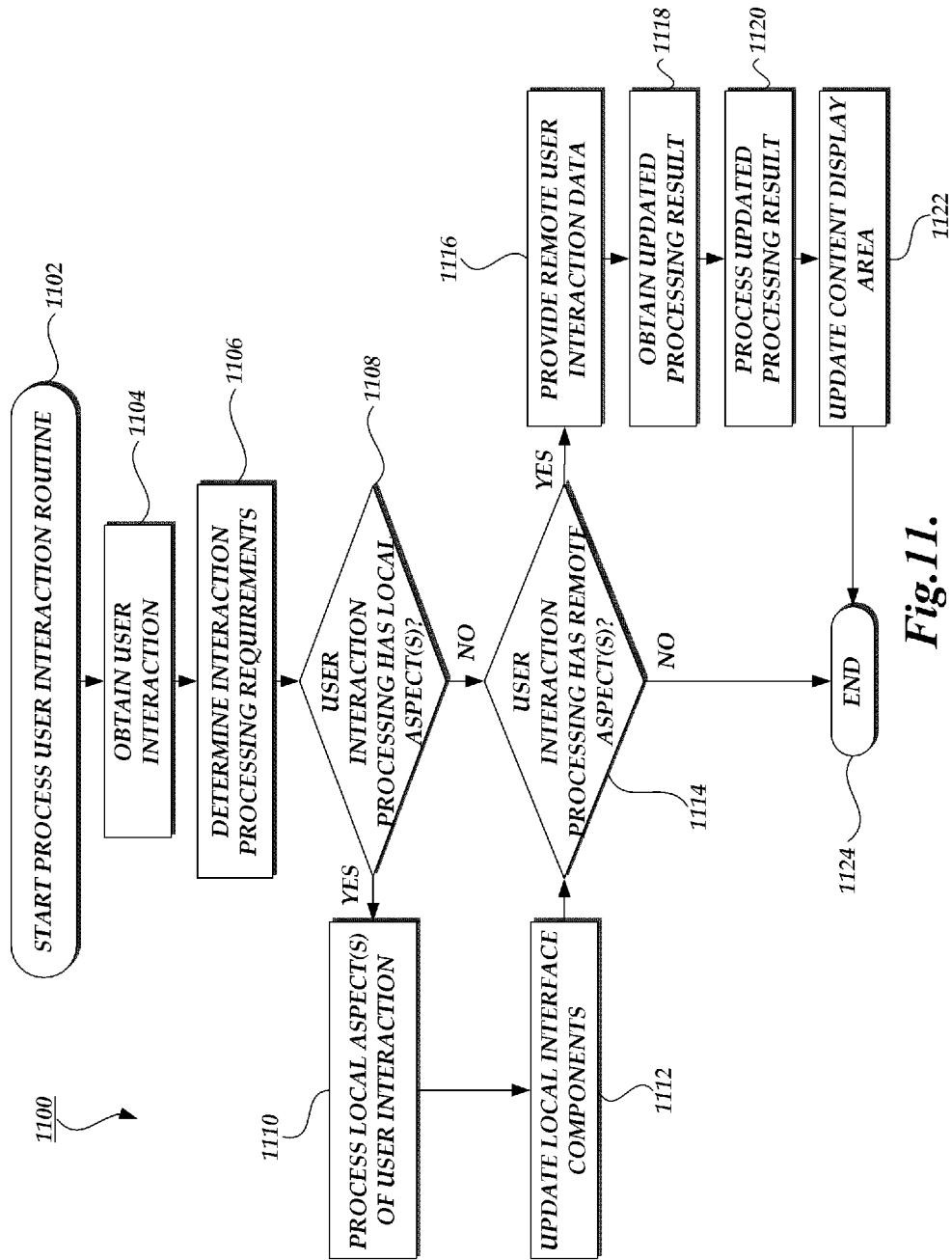
FIG. 11 is a flow diagram illustrative of a process user interaction routine implemented by a client computing device.

FIG. 11 is a flow diagram illustrative of a process user interaction routine 1100 implemented by a client computing device 102. Process user interaction routine 1100 begins at block 1102 in response to an interaction by a user. Illustratively, process user interaction routine 1100 may begin subsequent to the display of content in a content display area of a browser interface. For example, process user interaction routine 1100 may correspond to block 1014 of FIG. 10 above.

Illustratively, the displayed content may have one or more interactive elements, such as forms, buttons, animations, etc. User interaction with these interactive elements may require processing and display of updated content in the content display area. For example, selecting an element in a drop-down menu on a Web page may require processing and may change the configuration or visual appearance of the Web page or embedded resources. Illustratively, the processing required by user interaction with the displayed content may be handled as a local user interaction at the client computing device 102 or as a remote user interaction at the NCC POP 142 depending on the remote session browsing configuration in use. For example, if a remote session browsing configuration utilizing substantial local processing (e.g., sending unprocessed files over HTML), user interactions with displayed content may typically be handled as local user interactions at the client computing device 102. Illustratively, handling user interactions with displayed content as local user interactions at the client computing device 102 may allow for better responsiveness and fewer delays with simple user interactions (e.g., selection of a radio button, or typing text into a field), as interaction data corresponding to the interaction does not need to be sent to the NCC POP 142 for processing.

As a further example, if a remote session browsing configuration utilizing heavy remote processing of content (e.g., sending processed bitmap data over RDP) is being used as the remote session browsing configuration, all user interactions with displayed content may be handled as remote user interactions. For example, user input (e.g., keyboard inputs and cursor positions) may be encapsulated in RDP protocol data units and transmitted across network 108 to the NCC POP 142 for processing. Illustratively, the NCC POP 142 may apply the user interactions to the network content and transmit processing results consisting of updated bitmaps and interface data corresponding to an updated representation of the content back to the client computing device 102. Illustratively, handling user interactions with displayed content as remote user interactions at the NCC POP 142 may have a negative impact on interface responsiveness, as data is required to pass over the network and is limited by network latency; however, user interactions that require a substantial amount of processing may perform better when handled as remote user interactions, as the processing latency of the NCC POP 142 may be substantially lower than the processing latency of the client computing device 102.

In addition to a content display area for displaying network content, a browser may have one or more local interface components, such as toolbars, menus, buttons, or other user interface controls. Interactions with local interface components may be treated as local user interactions or remote user interactions depending on the processing required by the interaction and the remote session browsing configuration as further depicted in illustrative FIG. 7A. For example, some local interface components may be managed locally by browser code running on the client computing device, while other local interface components may have one or more locally managed aspects (e.g., button click feedback, scroll bar redraw, etc), and one or more remote managed aspects treated as remote user interactions (e.g., page refresh, requesting a page at an address in an address bar, etc.)

At block 1104, the client computing device 102 obtains a user interaction from the user. This user interaction may be an interaction with local interface components as described in FIG. 7A and above, or may be an interaction with any interactive elements of the content displayed in the content display area of the browser, such as form fields, buttons, animations, etc. User interaction with these local interface components or interactive elements of displayed content may require local and/or remote processing depending on the nature of the component or element and the processing split specified by the remote session browsing configuration as described in FIG. 7A and above. At block 1106, the client computing device 102 determines the interaction processing requirements for the obtained user interaction. At decision block 1108, if the user interaction has local aspects (e.g., button click feedback, a change to a local browser state, a content element being processed at the client computing device, etc.) the routine 1102 moves to block 1110 to process the local aspect or aspects of the user interaction at the client computing device 102 and subsequently update the local interface components at block 1112. Illustratively, and as discussed above, aspects of the interaction and updating interface components and elements locally allows a browser to provide responsive user interfaces and content. Subsequent to processing local aspect(s) of the user interaction, or if the user interaction has no local elements (e.g., a user interaction with a content element displayed in the content display area when using a remote session browsing configuration processing entirely on the server side and utilizing an RDP remote session communication protocol) the routine 1102 moves to decision block 1114. If the user interaction has remote aspects that require processing, the routine 1102 moves to block 1116 and provides remote user interaction data to the network computing provider 107. Illustratively, in the case of a heavily server side remote session browsing configuration utilizing an RDP remote session communication protocol, the remote user interaction data may include input data such as a cursor position or keyboard input encapsulated in one or more RDP protocol data units. In some embodiments of remote session browsing configurations utilizing RDP or other remote session communication protocols, particular aspects of remote user interaction data such as cursor positions may be provided to the network computing provider 107 on a continuous basis, while in other embodiments of remote session browse configurations remote user interaction data may only be provided to the network computing provider 107 when associated with a user interaction that requires remote processing.

At block 1118, the client computing device 102 obtains an updated processing result from the network computing provider 107, the network computing provider 107 having processed the remote user interaction data to generate an updated representation of the content. At block 1120, the client computing device 102 performs any additional processing required on the updated processing result (based on the remote session browsing configuration) and at block 1122 displays the updated processing result in the content display area of the browser. At block 1124 the process user interaction routine 1102 ends. Illustratively, the routine may be executed again any number of times in response to further user interactions with the browser and displayed content.

Figure 12:
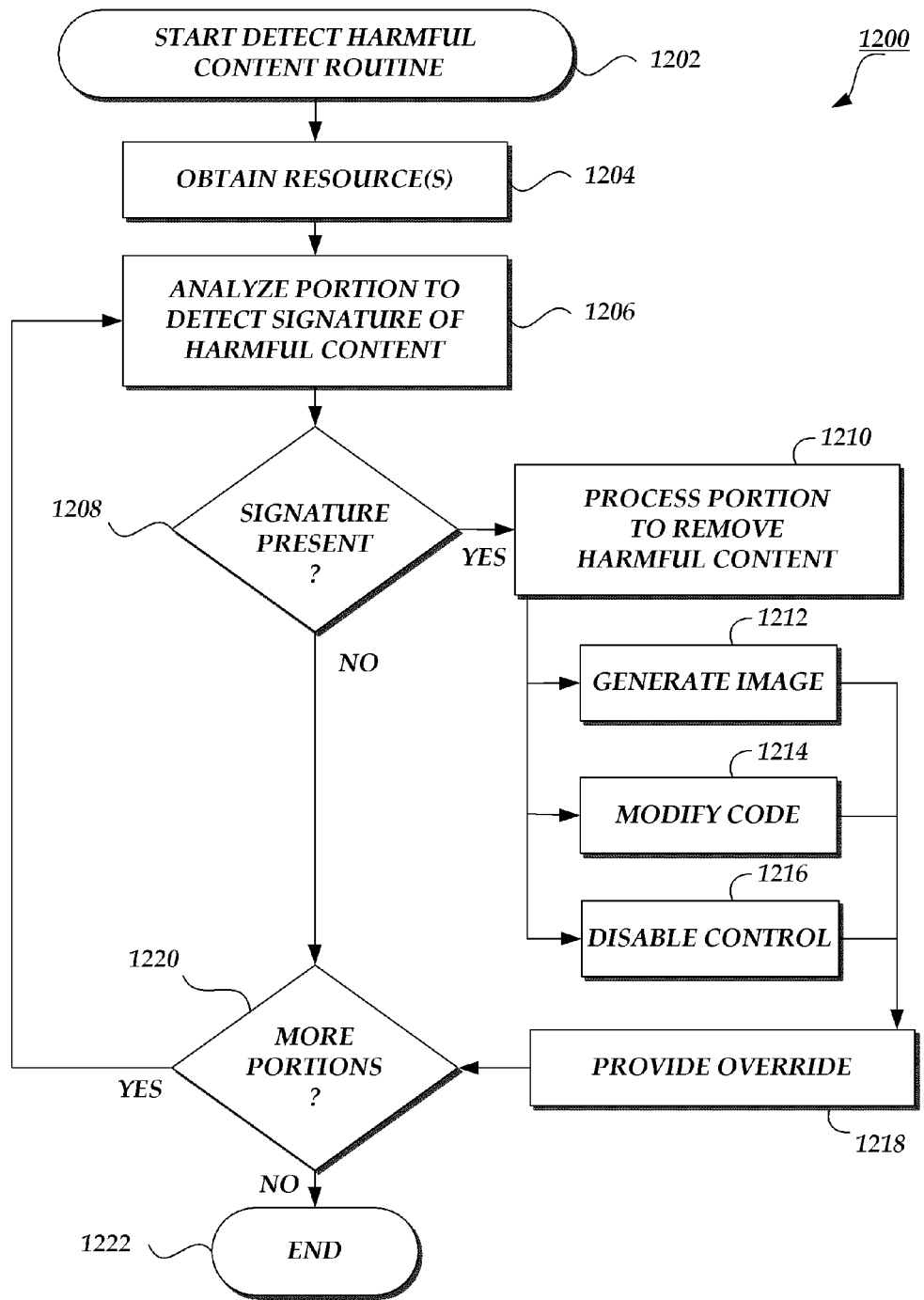
FIG. 12 is a flow diagram illustrative of a detect harmful content routine implemented by a network computing provider.

FIG. 12 is a flow diagram illustrating an example routine 1200 for detecting and dealing with harmful content, as implemented by an NCC POP 142. The routine 1200 can execute on an NCC 144 or some other component of the NCC POP 142. In some embodiments, the routine 1200 or some portion thereof can be implemented by a separate component of the network computing provider 107, or by a third party external to the network computing provider 107. Alternatively, the routine 1200 or some variant thereof may execute on the client computing device 102. While the description that follows focuses on detection of harmful content in web pages, the routine 1200 can be extended to other network-enabled resources that may include have harmful content, such as HTML-based and JavaScript-enabled email.

The routine 1200 begins at block 1202. An NCC POP 142 may be configured to execute the routine 1200 in response to each browsing session request received from a client computing device 102. In some embodiments, the routine 1200 may only be executed for certain client computing devices 102, or only for a subset of requests.

At block 1204, the NCC POP 142 can obtain the network resource or resources requested by a client computing device 102. Illustratively, a user of a client computing device 102 may have requested the web page illustrated in FIG. 7A. In response, the NCC POP 142 can retrieve, from a content provider 104 or some other content source, the HTML file that defines the web page. The HTML file, illustrated in FIG. 7B, has embedded within it several references to external resources, such as images. The NCC POP 142 can retrieve the corresponding images from a content provider 104, CDN service provider 106, cache component, or some other content source.

At block 1206, the NCC POP 142 can analyze the web page to detect signatures of malicious or otherwise harmful content. The NCC POP 142 can compare specific portions of the web page to the harmful content signatures 182 in the storage 144, or from some other source. For example, the NCC POP 142 can compare JavaScript functions and code statements to a repository of harmful functions and code statements. In some cases the code from the retrieved web page need not match harmful code in the repository character-for-character. Rather, a score can be determined that represents how closely the retrieved code matches code known to be harmful. If the score exceeds a threshold, the NCC POP 142 can determine that the code is indeed harmful and proceed to take preventative measures. In some embodiments, the NCC POP 142 can score the various portions of the page based on the likelihood that they are harmful or the magnitude of the harm that they may cause. The scores can be used as a basis for determining which portions to render or how to render them. For example, a portion scored as highly likely to be harmful and/or potentially extremely harmful may be blocked without any user option to retrieve or execute it, while one scored as only potentially harmful and/or not very harmful even in the worst case may be eligible for override by the user.

In another example, the NCC POP 142 can compare retrieved image files to a repository of images files known to be harmful. In some cases, the images need not be compared bit-by-bit, but rather a hash is created of the retrieved image, which is then compared to hashes of known harmful images in the repository. In some cases, the network address of an image is compared to a blacklist 186 containing network addresses of known harmful images. The network address need not match exactly. Rather, an entire domain, such as a domain associated with an advertising network known to distribute harmful advertisements, may be listed in the blacklist 186. Any image from the domain may be considered blacklisted. The blacklist 186 is not necessarily limited to images, but can encompass any resource. For example, any code files associated with the blacklisted domain may be considered blacklisted as well. In the advertising network example, code statements and embedded references to code files are often included with the advertising image file references embedded into web pages. Such code can be blacklisted individually, or included within the general blacklist that applies to the entire advertising network.

At decision block 1208, execution of the routine 1200 branches depending on whether a signature of harmful content or a blacklisted resource has been detected. If such a signature or blacklisted resource has been detected, execution proceeds to block 1210, where the NCC POP 142 can perform various actions to process the harmful content. If there was no signature of harmful content or blacklisted resource detected, the routine 1200 proceeds to block 1220 where the NCC POP 142 can determine whether there are more portions of the requested content to process.

At block 1210, the NCC POP 142 can process the portion of the retrieved network resource to remove or otherwise disable the potentially harmful content. The NCC POP 142 can, depending on the nature of the portion of the resource and the nature of the potential harm, perform one or more operations to reduce or prevent the harm. Such operations can include generating an image of the portion at block 1212, removing executable code at block 1214, and disabling the portion at block 1216. For example, at block 1212, if the potentially harmful portion relates to a visual aspect of the web page, the NCC POP 142 can generate a static image of the portion for display as described in detail above with reference to FIGS. 7C and 7D. At block 1214, if the potentially harmful portion includes executable code, such as JavaScript, the code can be deleted, commented out, or otherwise modified as described above. At block 1216, if the portion includes an interactive control such as a text box or link, the control can be disabled as described above.

At block 1218, the NCC POP 142 can provide a mechanism for the user to override the protective measures implemented in blocks 1210-1216. For example, the NCC POP 142 can augment the web page with a control or link to retrieve the original, unprocessed content item, as described in detail above. In some embodiments, the NCC POP 142 can transmit metadata or executable code to the client computing device 102 indicating which portion or portions were modified or removed. Such metadata or executable code may be embedded into the web page or transmitted separately, within the response or in a separate transmission. For example, the NCC POP 142 can embed JavaScript into the web page. The JavaScript can alter the appearance of the modified portion so that users know which portion was modified. The metadata or executable code may also indicate why a portion was modified or removed. In some embodiments, the metadata may further indicate whether an unmodified portion may be requested, or a harmfulness score for the portion, as determined above in block 1206. The client computing device 102 browser 190 can use the metadata to provide controls or to support input commands to override the protective measure. In some embodiments, the browser 190 can display the harmfulness score received with the metadata.

The NCC POP 142 can store data related to the overrides in order to fine tune its detection of harmful content and to update the signatures and blacklist. For example, if an entire advertising network has been blacklisted, the NCC POP 142 may begin to receive overrides from users who wish to interact with the advertisements in order to navigate to the advertised web page, enroll in an advertised promote, purchase an advertised product, etc. In response to receiving a statistically significant number of such overrides associated with a specific advertisement, the NCC POP 142 can update the blacklist 186 or signatures 184 to permit the specific advertisement. In response to receiving a statistically significant number of such overrides for a substantial number of advertisements associated with the advertising network, the NCC POP 142 may remove the blacklist designation from the entire advertising network, and instead add blacklist designations for only specific advertisements.

At decision block 1220 the NCC POP 142 can determine whether there are more portions of the requested content to process. If there are, the routine 1200 can return to block 1216. Otherwise, the routine 1200 can proceed to block 1222, where execution ends.

In some embodiments, the NCC POP 142 can transmit data, rather than modified network resources, to the client computing device 102. For example, the browser of the client computing device 102 may be configured to retrieve web pages directly from content providers 104 rather than requesting web pages from the NCC POP 142. In such cases, the client computing device 102 can have access to a repository of signatures and/or a blacklist, such as the signatures 184 and blacklist 186 described above. The browser or some other component of the client computing device 102 can perform the detection and disablement of harmful content. The client computing device 102 can receive updated signatures and other information, on demand or on a subscription basis, from the NCC POP 142 to address newly discovered risks and the like. In some embodiments, the NCC POP 142 can provide access to the updated signatures and blacklist as a paid service. In some embodiments, the NCC POP 142 can continue to process web pages for other client computing devices 102 that access web pages through the NCC POP 142. The NCC POP 142 can therefore continue to update its repository of signatures 184 and/or its blacklist 186 and provide updates to the client computing devices 102 which do not request web pages through the NCC POP 142.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Depending on the embodiment, certain acts, events, or functions of any of the algorithms or program routines described herein can be performed in a different sequence, can be added, merged, or left out all together (e.g., not all described acts or events are necessary for the practice of the routine). Moreover, in certain embodiments, acts or events can be performed concurrently, e.g., through multi-threaded processing, interrupt processing, or multiple processors or processor cores or on other parallel architectures, rather than sequentially.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements, or blocks in the flow diagrams described herein and/or depicted in the attached FIGURES should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for protecting a client computing device from harmful network resources, the system comprising:
   one or more computer processors;
   a computer memory accessible by at least one of the one or more computer processors; and
   a network computing component comprising an executable software module in the computer memory, the executable software module executed by the one or more computer processors, wherein the network computing component is configured to perform operations comprising:
      hosting an instance of a browsing application, the instance of the browsing application in communication with a browsing application of a client computing device;
      obtaining a network resource from one or more content sources, the network resource comprising a plurality of portions of source code;
      determining that a first portion of source code is identified as harmful;
      in response to determining that the first portion of source code is identified as harmful, modifying the network resource, wherein modifying the network resource comprises:
         generating a visual representation of a harmful network resource referenced in the first portion of source code,
         disabling, in the first portion of source code, a reference to the harmful network resource, and
         inserting, into the first portion of source code, a reference to the generated visual representation of the harmful network resource; and providing, to the browsing application of the client computing device, the modified network resource.

2. The system of claim 1, wherein the reference to the harmful network resource is a network address associated with the harmful network resource, and wherein generating a visual representation of the harmful network resource comprises:
   obtaining, using the network address, the harmful network resource; and
   rendering the harmful network resource to generate the visual representation of the harmful resource.

3. The system of claim 1, wherein determining that a first portion of source code is identified as harmful comprises:
   obtaining a plurality of signatures of network resources identified as harmful;
   comparing a signature of the harmful network resource referenced in the first portion to one or more of the plurality of signatures of network resources; and
   determining, from the comparisons, that the harmful network resource referenced in the first portion is identified as harmful.

4. The system of claim 1, wherein determining that a first portion of source code is identified as harmful comprises:
   obtaining a plurality of signatures comprising hashes of respective portions of network resources identified as harmful;
   comparing a hash of the harmful network resource referenced in the first portion to one or more of the plurality of signatures of network resources; and
   determining, from the comparisons, that the hash of the harmful network resource referenced in the first portion is identified as harmful.

5. The system of claim 1, wherein determining that a first portion of source code is identified as harmful comprises:
   obtaining a plurality of signatures comprising network addresses included in respective portions of network resources that are identified as harmful; and
   comparing a network address associated with the harmful network resource referenced in the first portion to one or more of the plurality of signatures; and
   determining, from the comparisons, that the network address associated with the harmful network resource is identified as harmful.

6. A computer-implemented method comprising:
   hosting an instance of a browsing application, the instance of the browsing application in communication with a browsing application of a client computing device;
     obtaining a network resource from one or more content sources, the network resource comprising a plurality of portions of source code;
     determining that a first portion of source code, of the plurality of portions of source code, is identified as harmful;
     in response to determining that the first portion of source code is identified as harmful, modifying the network resource, wherein modifying the network resource comprises
       generating a visual representation of a harmful network resource referenced in the first portion of source code,
       disabling, in the first portion of source code, a reference to the harmful network resource, and
       inserting, into the first portion of source code, a reference to the generated visual representation of the harmful network resource; and
     providing, to the browsing application of the client computing device, the modified network resource,
   wherein the method is performed by a network computing component comprising hardware.

7. The computer-implemented method of claim 6, wherein a network resource comprises a web page, an image, a video, an applet, or a document.

8. The computer-implemented method of claim 6, wherein determining that a first portion of source code is identified as harmful comprises:
   determining that the first portion includes a reference to a blacklisted external resource.

9. The computer-implemented method of claim 6, wherein the reference to the harmful network resource is a network address associated with the harmful network resource, and wherein generating a visual representation of the harmful network resource comprises:
   obtaining, using the network address, the harmful network resource; and
   rendering the harmful network resource to generate the visual representation of the harmful resource.

10. The computer-implemented method of claim 6, wherein determining that a first portion of source code is identified as harmful comprises:
    obtaining a plurality of signatures of network resources identified as harmful;
    comparing a signature of the harmful network resource referenced in the first portion to one or more of the plurality of signatures of network resources; and
    determining, from the comparisons, that the harmful network resource referenced in the first portion is identified as harmful.

11. The computer-implemented method of claim 6, wherein determining that a first portion of source code is identified as harmful comprises:
    obtaining a plurality of signatures comprising hashes of respective portions of network resources identified as harmful;
    comparing a hash of the harmful network resource referenced in the first portion to one or more of the plurality of signatures of network resources; and
    determining, from the comparisons, that the hash of the harmful network resource referenced in the first portion is identified as harmful.

12. The computer-implemented method of claim 6, wherein determining that a first portion of source code is identified as harmful comprises:
    obtaining a plurality of signatures comprising network addresses included in respective portions of network resources that are identified as harmful; and
    comparing a network address associated with the harmful network resource referenced in the first portion to one or more of the plurality of signatures; and
    determining, from the comparisons, that the network address associated with the harmful network resource is identified as harmful.

13. The computer-implemented method of claim 6, further comprising:
    providing, to the client computing device, data identifying an unmodified first portion.

14. The computer-implemented method of claim 13, further comprising:
    receiving, from the client computing device, a request to receive the unmodified first portion.

15. The computer-implemented method of claim 6, wherein a network resource comprises a web page, an image, a video, an applet, or a document.

16. A system for overriding protective measures applied to network resources, the system comprising:

a network computing component comprising hardware, the network computing component operable to:

provide, to a client device, a network resource comprising a plurality of portions of source code, wherein a portion identified as harmful is modified, and wherein modifying the identified portion comprises:
- generating a visual representation of a harmful network resource referenced in the portion,
- disabling a reference to the harmful network resource, and
- including reference to the generated visual representation of the harmful network resource;

receive, from the client device, override data, wherein the override data comprises a request from a user of the client device to receive an unmodified version of the modified portion; and provide, to the client device, the unmodified version.

17. The system of claim 16, wherein providing the unmodified version comprises providing, to the client device, the network resource, wherein the portion is not modified.

18. The system of claim 16, wherein the network computing component is further operable to receive override data from a plurality of client computing devices, the override data associated with the portion.

19. The system of claim 18, wherein the network computing component is further operable to modify a repository associated with harmful network resources in response to receiving a statistically significant amount of override data from the plurality of client computing devices.

20. The system of claim 16, wherein a network resource comprises a web page, an image, a video, an applet, or a document.

21. A non-transitory computer storage medium that stores an executable browser component that directs a user computing device to perform a process that comprises:

transmitting, to a proxy server, a request for a content page;

receiving from the proxy server a modified version of the content page with metadata reflective of how the content page was modified by the proxy server, the modified version including a modified portion of source code identified by the proxy server as harmful, wherein the metadata identifies one or more modifications of the portion of source code including:
- a reference to a visual representation, generated by the proxy server and stored on the proxy server, of a harmful network resource, referenced in an unmodified version of the portion, was inserted in the portion, and
- a reference to the harmful network resource was disabled; and displaying the modified version of the content page on the user computing device together with a selectable user option to initiate retrieval of the portion identified as harmful, the user option displayed in response to the metadata.

22. The non-transitory computer storage medium of claim 21, wherein the metadata is embedded in the modified version of the content page.

23. The non-transitory computer storage medium of claim 21, wherein the metadata is received by the user computing device separately from the modified version of the content page.

24. The non-transitory computer storage medium of claim 21, wherein the metadata specifies a harmfulness rating of the portion, and the method further comprises displaying an indication of the harmfulness rating.

25. The non-transitory computer storage medium of claim 21, wherein the process further comprises receiving from the proxy server executable code, wherein the executable code causes display of a visual indicator of how the content page was modified by the proxy server.

26. The non-transitory computer storage medium of claim 21, wherein a network resource comprises a web page, an image, a video, an applet, or a document.

* * * * *